US010995246B2

(12) United States Patent
Colin et al.

(10) Patent No.: US 10,995,246 B2
(45) Date of Patent: May 4, 2021

(54) CROSS-LINKABLE SILYLATED POLYMER-BASED ADHESIVE COMPOSITIONS

(71) Applicants: BOSTIK SA, La Plaine Saint Denis (FR); CENTRE NATIONAL DE LA RECHERCHE SCIENTIFIQUE (CNRS), Paris (FR); UNIVERSITE DE RENNES I, Rennes (FR)

(72) Inventors: Boris Colin, Compiegne (FR); Guillaume Michaud, Compiegne (FR); Frederic Simon, Pont l'eveque (FR); Olivier Lavastre, Gahard (FR)

(73) Assignees: BOSTIK SA, La Plaine Saint Denis (FR); Centre National de la Recherche Scientifique (CNRS), Paris (FR); UNIVERSITE DE RENNES 1, Rennes (FR)

( * ) Notice: Subject to any disclaimer, the term of this patent is extended or adjusted under 35 U.S.C. 154(b) by 122 days.

(21) Appl. No.: 16/310,054

(22) PCT Filed: Jun. 5, 2017

(86) PCT No.: PCT/FR2017/051410
§ 371 (c)(1),
(2) Date: Dec. 14, 2018

(87) PCT Pub. No.: WO2017/216446
PCT Pub. Date: Dec. 21, 2017

(65) Prior Publication Data
US 2019/0330503 A1    Oct. 31, 2019

(30) Foreign Application Priority Data
Jun. 14, 2016 (FR) ...................................... 1655501

(51) Int. Cl.
*C09J 175/08* (2006.01)
*C08G 18/18* (2006.01)
(Continued)

(52) U.S. Cl.
CPC ........ *C09J 175/08* (2013.01); *C08G 18/1825* (2013.01); *C08G 18/222* (2013.01);
(Continued)

(58) Field of Classification Search
None
See application file for complete search history.

(56) References Cited

U.S. PATENT DOCUMENTS 3,471,434 A * 10/1969 Guenther .................. C07F 7/04
  524/859
3,703,497 A * 11/1972 Donald ................ C08G 59/405
  528/120

(Continued)

OTHER PUBLICATIONS

Singh et al. "Reactions of Oximes and Diethylhydroxylamine with Titanium Alkoxides" J. Chem. Soc. (A), 1971, 2440-2444. (Year: 1971).*

(Continued)

*Primary Examiner* — Robert S Loewe
(74) *Attorney, Agent, or Firm* — Millen, White, Zelano & Branigan, PC; Ryan Pool

(57) ABSTRACT

The present invention provides a curable adhesive composition comprising at least one curable silylated polymer and at least one curing catalyst obtained by reaction of a metal alkoxide and an oxime. The present invention also provides the use of a metal compound obtained by reaction of a metal alkoxide and an oxime as curing catalyst for silylated polymers.

20 Claims, 2 Drawing Sheets

(51) Int. Cl.
*C08G 18/22* (2006.01)
*C08G 18/28* (2006.01)
*C08G 18/48* (2006.01)
*C08G 18/71* (2006.01)
*C09J 171/02* (2006.01)
*C09J 183/08* (2006.01)
*C09J 201/10* (2006.01)

(52) U.S. Cl.
CPC ....... *C08G 18/289* (2013.01); *C08G 18/4825* (2013.01); *C08G 18/718* (2013.01); *C09J 171/02* (2013.01); *C09J 183/08* (2013.01); *C09J 201/10* (2013.01)

(56) References Cited

U.S. PATENT DOCUMENTS

| | | | | |
|---|---|---|---|---|
| 4,525,565 A | * | 6/1985 | Laisney | C08K 5/0091 528/17 |
| 4,956,435 A | | 9/1990 | Chu et al. | |
| 5,087,684 A | * | 2/1992 | Perrin | C08K 5/32 523/213 |
| 5,264,484 A | * | 11/1993 | Arai | C08K 5/33 524/714 |
| 6,054,546 A | * | 4/2000 | Suzuki | C09D 133/062 524/267 |
| 2007/0265409 A1 | * | 11/2007 | Wakabayashi | C08K 5/16 528/28 |
| 2009/0082515 A1 | * | 3/2009 | Sakamoto | C08K 5/54 524/493 |
| 2011/0207886 A1 | * | 8/2011 | Wakabayashi | C07F 7/126 525/102 |
| 2012/0160413 A1 | | 6/2012 | Laferte et al. | |

OTHER PUBLICATIONS

Gelest catalog "Reactive Silicones: Forging New Polymer Links" 64 pages, 2013. (Year: 2013).*
International Search Report for PCT/FR2017/051410 dated Aug. 24, 2017.
"Silicones", Apr. 15, 2003, Encyclopedia of Polymer Science and Technology, pp. 765-841, XP007918236.
Wolfram Schindler: "Alpha-silane-terminated polymers as novel binders for fast curing elastic adhesives," Presentation at the European Coatings Show, 2005, pp. 1-12, XP002576067.

* cited by examiner

CROSS-LINKABLE SILYLATED POLYMER-BASED ADHESIVE COMPOSITIONS

FIELD OF THE INVENTION

The present invention relates to an adhesive composition comprising at least one curable silylated polymer and at least one metal catalyst.

BACKGROUND TO THE INVENTION

Silylated polymers can be used in various types of applications, for example in adhesive compositions useful for all types of bonding such as the bonding of surface coatings, or useful for forming a waterproofing membrane or for producing self-adhesive items.

Silylated polymers can be cured even at room temperature by reaction of the reactive silylated group with moisture in the air. To accelerate curing, a curing catalyst can be added to the silylated polymer.

Generally, the curing catalyst used in silylated polymer adhesive compositions is a tin catalyst, such as dibutyltin dilaurate (DBTDL), dibutyltin diacetate or dibutyltin bis (acetylacetonate).

However, the toxicity of these tin catalysts is increasingly highlighted, leading manufacturers to avoid their use.

Tin-free catalysts, such as bismuth neodecanoate and zinc octoate, have been developed for curing silylated polymers. These tin-free catalysts are 2 to 3 times less efficient than tin catalysts. To obtain curing times equivalent to those obtained with tin catalysts, therefore, it will be necessary to use 2 to 3 times more bismuth neodecanoate or zinc octoate catalysts.

When used, the curing catalyst must control the curing kinetics of the silylated polymer, but it must also remain stable before use, while the adhesive composition is being stored. Furthermore, for optimal use of the adhesive composition, said composition must not cure during storage and the catalyst must remain active to ensure its catalyst function when the adhesive composition is being applied, at the time the polymer cures, in the presence of atmospheric moisture.

US Patent Application 2013/0096252 discloses a composition comprising a silylated polymer and a tin-free amine or organometallic curing catalyst. That document describes, among other things, titanium butoxide catalysts. An adhesive composition comprising a silylated polymer and a titanium butoxide catalyst is not stable. Indeed, the polymer cures, for example during storage, even before the adhesive composition is used.

US Patent Application 2009/275702 discloses a composition comprising a silylated polymer and a titanium curing catalyst. That document notably discloses a catalyst based on titanium and acetylacetonate. That type of catalyst leads to long curing times, in particular longer than the curing times achieved with the catalysts according to the invention.

U.S. Pat. No. 4,956,435 discloses a composition comprising a trialkoxysilylethylene-terminated polyorganosiloxane, a titanium catalyst and an alkoxysilane co-catalyst and optionally an oxime. Due to the presence of the alkoxysilane co-catalyst, said document U.S. Pat. No. 4,956,435 does not disclose the preparation of a catalyst, isolated beforehand, obtained by reaction of a metal alkoxide with an oxime as defined in the present invention.

The aim of the present invention is to provide a curable adhesive composition, free of tin, in particular alkyl tin, which has both a good stability, in particular during storage, and a satisfactory curing time.

SUMMARY OF THE INVENTION

A first subject of the present invention relates to an adhesive composition comprising at least one silylated polymer (A) and at least one catalyst (B), said at least one silylated polymer comprising at least one, preferably at least two groups of formula (I):

wherein:
- $R^4$ represents a linear or branched alkyl radical having from 1 to 4 carbon atoms, it being possible that when there are several radicals $R^4$, the latter are identical or different;
- $R^5$ represents a linear or branched alkyl radical having from 1 to 4 carbon atoms, it being possible that when there are several radicals $R^5$, the latter are identical or different, it being possible that two groups $OR^5$ may be engaged in the same ring;
- p is an integer equal to 0, 1 or 2;

and said at least one catalyst being selected from the metal compounds obtained by reaction:
- of at least one metal alkoxide,
- with at least one oxime selected from an oxime of formula (V) or an oxime of formula (VI):

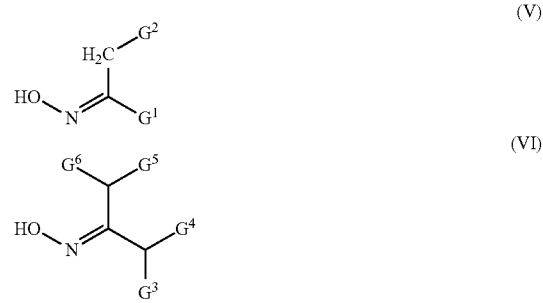

wherein:
- $G^1$ is a hydrogen atom or a linear or branched alkyl radical having from 1 to 4 carbon atoms;
- $G^2$ is a hydrogen atom or a radical selected from a linear or branched alkyl radical having from 1 to 10 carbon atoms, a linear or branched alkenyl radical having from 2 to 10 carbon atoms, a cyclic alkyl radical having from 3 to 10 carbon atoms, an aryl radical or a radical $-N(G^7G^8)$ where $G^7$ and $G^8$ independently represent a linear or branched alkyl radical having from 1 to 10 carbon atoms or a linear or branched alkenyl radical having from 2 to 10 carbon atoms or a benzyl radical;
- $G^3$ represents either a hydrogen atom or an alkyl group having from 1 to 4 carbon atoms, or forms the remainder of an aliphatic ring having between 4 and 14 carbon atoms with the groups $G^4$ and/or $G^5$ and/or $G^6$, said aliphatic ring optionally comprising one or more heteroatoms and/or one or more double bonds and said aliphatic ring being optionally substituted by one or more alkyl groups having from 1 to 4 carbon atoms,
- $G^4$ represents either a hydrogen atom or an alkyl group having from 1 to 4 carbon atoms, or forms the remainder of an aliphatic ring having between 4 and 14 carbon atoms with the groups $G^3$ and/or $G^5$ and/or $G^6$, said aliphatic ring optionally comprising one or more heteroatoms and/or one or more double bonds and said aliphatic ring being optionally substituted by one or more alkyl groups having from 1 to 4 carbon atoms, it being understood that at least one of the groups $G^3$ or $G^4$ forms the remainder of an aliphatic ring with at least one of the groups $G^5$ or $G^6$;

$G^5$ represents either a hydrogen atom or an alkyl group having from 1 to 4 carbon atoms, or forms the remainder of an aliphatic ring having between 4 and 14 carbon atoms with the groups $G^3$ and/or $G^4$ and/or $G^6$, said aliphatic ring optionally comprising one or more heteroatoms and/or one or more double bonds and said aliphatic ring being optionally substituted by one or more alkyl groups having from 1 to 4 carbon atoms, $G^6$ represents either a hydrogen atom or an alkyl group having from 1 to 4 carbon atoms, or forms the remainder of an aliphatic ring having between 4 and 14 carbon atoms with the groups $G^3$ and/or $G^4$ and/or $G^5$, said aliphatic ring optionally comprising one or more heteroatoms and/or one or more double bonds and said aliphatic ring being optionally substituted by one or more alkyl groups having from 1 to 4 carbon atoms, it being understood that at least one of the groups $G^5$ or $G^6$ forms the remainder of an aliphatic ring with at least one of the groups $G^3$ or $G^4$.

According to one embodiment of the invention, the silylated polymer corresponds to one of the formulae (II), (III), (IV) or (VII):

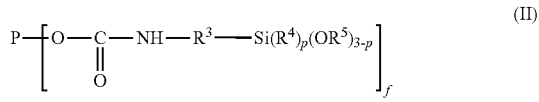

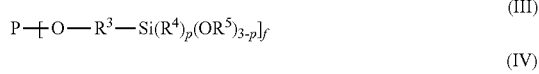

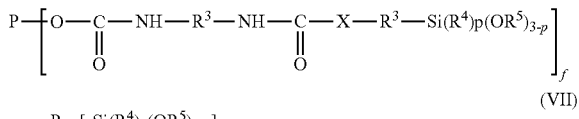

wherein:
$R^4$, $R^5$ and p have the same meaning as in the formula (I) described in the present invention, P represents a saturated or unsaturated, linear or branched polymer radical optionally comprising one or more heteroatoms, such as oxygen, nitrogen, sulphur, silicon, and preferably having a number-average molar mass ranging from 100 g/mol to 48600 g/mol, more particularly from 300 g/mol to 18600 g/mol or even from 500 g/mol to 12600 g/mol, P' represents a polysiloxane, preferably having a number-average molar mass ranging from 100 g/mol to 48600 g/mol, more particularly from 300 g/mol to 18600 g/mol or even from 500 g/mol to 12600 g/mol, $R^1$ represents a divalent hydrocarbon radical having from 5 to 15 carbon atoms which may be aromatic or aliphatic, linear, branched or cyclic, $R^3$ represents a linear or branched divalent alkylene radical having from 1 to 6 carbon atoms, preferably from 1 to 3 carbon atoms, X represents a divalent radical selected from —NH—, —$NR^7$— or —S—, $R^7$ represents a linear or branched alkyl radical having from 1 to 12 carbon atoms, f is an integer ranging from 1 to 6, preferably ranging from 2 to 5, more preferably ranging from 2 to 3.

According to one embodiment of the invention, the metal alkoxide corresponds to the formula $M(OR)_y$ where M represents a metal, preferably selected from titanium, zirconium, aluminium, silicon, hafnium, barium, cerium and antimony, y is equal to 3 or 4, and R represents a linear or branched alkyl group having from 1 to 5 carbon atoms, preferably from 2 to 4 carbon atoms, preferably from 3 to 4 carbon atoms, or a linear or branched alkenyl group having from 2 to 5 carbon atoms, preferably from 2 to 4 carbon atoms, preferably from 3 to 4 carbon atoms.

According to one embodiment of the invention, the oxime is an oxime of formula (V) wherein:

$G^1$ represents a methyl group or an ethyl group; and $G^2$ represents hydrogen or a linear or branched alkyl group having from 1 to 8 carbon atoms, or a phenyl group, or a group —$N(G^7G^8)$ where $G^7$ and $G^8$ represent a methyl, ethyl, propyl, butyl, pentyl or benzyl (—$CH_2$—$C_6H_5$) group;

or an oxime of formula (VI) wherein:
$G^3$ and $G^6$ each represent a hydrogen atom; and
$G^4$ and $G^5$ form an aliphatic ring having from 5 to 11 carbon atoms, said ring being optionally substituted by one or more methyl, ethyl and/or propyl groups and said ring optionally comprising one or more heteroatoms selected from an oxygen atom or a nitrogen atom, said nitrogen atom then not being bonded to a hydrogen atom.

According to one embodiment of the invention, the catalyst (B) is obtained by reaction:

of an alkoxide selected from the following compounds: $Ti(OiPr)_4$, $Ti(OnPr)_4$, $Ti(OnBu)_4$, $Zr(OiPr)_4$, $Zr(OnPr)_4$, $Zr(OnBu)_4$;

and an oxime selected from the oximes of formula (V-1) and the oximes of formula (VI-1):

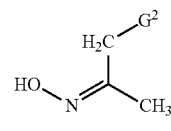

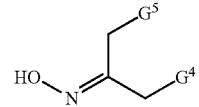

wherein:
$G^2$ represents H or a methyl, ethyl, iso-propyl, n-propyl, n-butyl, iso-butyl, —$N(CH_2$—$C_6H_5)_2$ group;
$G^4$ and $G^5$ form a saturated aliphatic ring having from 5 to 11 carbon atoms.

According to one embodiment of the invention, the adhesive composition comprises at least 0.05% by weight, preferably from 0.1 to 10% by weight, preferably from 0.5 to 5% by weight, more preferably from 1 to 3% by weight, of catalyst (B) based on the total weight of the adhesive composition.

According to one embodiment of the invention, the adhesive composition comprises at least 5% by weight, preferably at least 10% by weight, more preferably at least 15% by weight, of silylated polymer (A) based on the total weight of the adhesive composition.

According to one embodiment of the invention, the adhesive composition further comprises fillers, preferably in an amount less than or equal to 80% by weight, preferably ranging from 20 to 70% by weight, more preferably from 30 to 60% by weight, of the total weight of the adhesive composition.

According to one embodiment of the invention, the adhesive composition is characterized in that the silylated polymer (A) and the catalyst (B) are packaged in two separate compartments.

The present invention also provides the use a metal compound obtained by reaction:
  of at least one metal alkoxide,
  with at least one oxime selected from an oxime of formula (V) or an oxime of formula (VI):

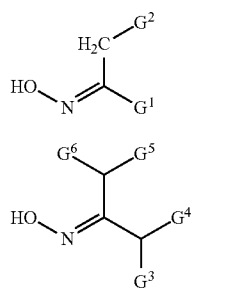

wherein:
  $G^1$ is a hydrogen atom or a linear or branched alkyl radical having from 1 to 4 carbon atoms;
  $G^2$ is a hydrogen atom or a radical selected from a linear or branched alkyl radical having from 1 to 10 carbon atoms, a linear or branched alkenyl radical having from 2 to 10 carbon atoms, a cyclic alkyl radical having from 3 to 10 carbon atoms, an aryl radical or a radical —N($G^7G^8$) where $G^7$ and $G^8$ independently represent a linear or branched alkyl radical having from 1 to 10 carbon atoms or a linear or branched alkenyl radical having from 2 to 10 carbon atoms or a benzyl radical;
  $G^3$ represents either a hydrogen atom or an alkyl group having from 1 to 4 carbon atoms, or forms the remainder of an aliphatic ring having between 4 and 14 carbon atoms with the groups $G^4$ and/or $G^5$ and/or $G^6$, said aliphatic ring optionally comprising one or more heteroatoms and/or one or more double bonds and said aliphatic ring being optionally substituted by one or more alkyl groups having from 1 to 4 carbon atoms,
  $G^4$ represents either a hydrogen atom or an alkyl group having from 1 to 4 carbon atoms, or forms the remainder of an aliphatic ring having between 4 and 14 carbon atoms with the groups $G^3$ and/or $G^5$ and/or $G^6$, said aliphatic ring optionally comprising one or more heteroatoms and/or one or more double bonds and said aliphatic ring being optionally substituted by one or more alkyl groups having from 1 to 4 carbon atoms,
  it being understood that at least one of the groups $G^3$ or $G^4$ forms the remainder of an aliphatic ring with at least one of the groups $G^5$ or $G^6$;
  $G^5$ represents either a hydrogen atom or an alkyl group having from 1 to 4 carbon atoms, or forms the remainder of an aliphatic ring having between 4 and 14 carbon atoms with the groups $G^3$ and/or $G^4$ and/or $G^6$, said aliphatic ring optionally comprising one or more heteroatoms and/or one or more double bonds and said aliphatic ring being optionally substituted by one or more alkyl groups having from 1 to 4 carbon atoms,
  $G^6$ represents either a hydrogen atom or an alkyl group having from 1 to 4 carbon atoms, or forms the remainder of an aliphatic ring having between 4 and 14 carbon atoms with the groups $G^3$ and/or $G^4$ and/or $G^5$, said aliphatic ring optionally comprising one or more heteroatoms and/or one or more double bonds and said aliphatic ring being optionally substituted by one or more alkyl groups having from 1 to 4 carbon atoms,
  it being understood that at least one of the groups $G^5$ or $G^6$ forms the remainder of an aliphatic ring with at least one of the groups $G^3$ or $G^4$;
as curing catalyst for silylated polymers comprising at least one, preferably at least two groups of formula (I):

wherein:
  $R^4$ represents a linear or branched alkyl radical having from 1 to 4 carbon atoms, it being possible that when there are several radicals $R^4$, the latter are identical or different;
  $R^5$ represents a linear or branched alkyl radical having from 1 to 4 carbon atoms, it being possible that when there are several radicals $R^5$, the latter are identical or different, it being possible that two groups $OR^5$ may be engaged in the same ring;
  p is an integer equal to 0, 1 or 2.

The invention also provides a bonding method comprising applying the adhesive composition according to the invention to a surface and then curing said adhesive composition.

The adhesive composition according to the invention may be in one-component form.

The adhesive composition according to the invention is tin-free.

The adhesive composition according to the invention is stable during storage. The stability of the adhesive composition may have two aspects: (1) absence of curing of the silylated polymer during storage or very limited curing during storage and (2) stability of the alkoxide-derived catalyst.

The catalyst remains stable in the adhesive composition according to the invention during storage of said adhesive composition.

The curing time of the adhesive composition according to the invention is improved, in particular the curing time should generally not be excessive.

Furthermore, the curing time of the adhesive composition may be adjusted as a function of the metal/oxime molar ratio of the metal catalyst. Depending on the applications envisaged, it will be desirable to obtain relatively long curing times.

DETAILED DESCRIPTION OF EMBODIMENTS OF THE INVENTION

Figure 1:
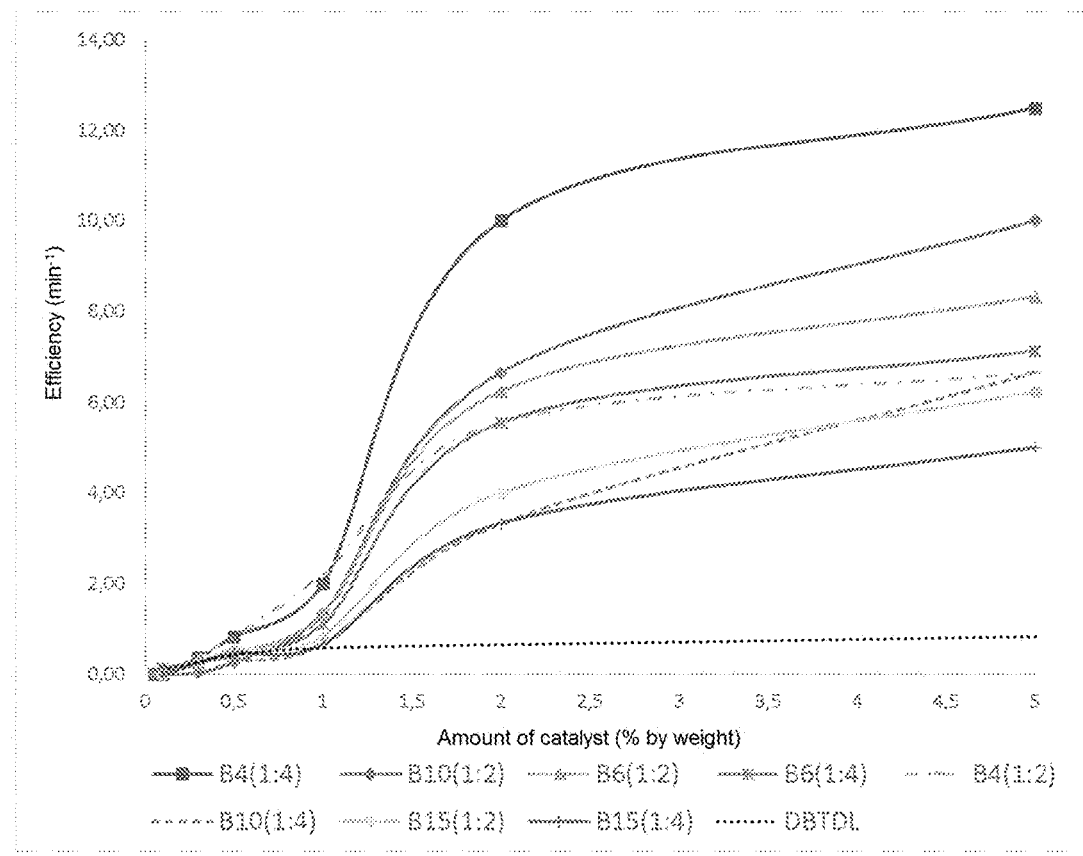
FIG. 1 shows the curing efficiency (quantifying the curing rate) of a silylated polymer as a function of the amount of catalyst for different catalysts.

The present invention relates to an adhesive composition comprising:

(A) at least one silylated polymer comprising at least one, preferably at least two groups of formula (I):

wherein:
R$^4$ represents a linear or branched alkyl radical having from 1 to 4 carbon atoms, it being possible that when there are several radicals R$^4$, the latter are identical or different;
R$^5$ represents a linear or branched alkyl radical having from 1 to 4 carbon atoms, it being possible that when there are several radicals R$^5$, the latter are identical or different, it being possible that two groups OR$^5$ may be engaged in the same ring;
p is an integer equal to 0, 1 or 2, preferably equal to 0 or 1;

(B) at least one catalyst selected from the organometallic compounds obtained by reaction:
of at least one metal alkoxide,
with at least one oxime selected from an oxime of formula (V) or an oxime of formula (VI):

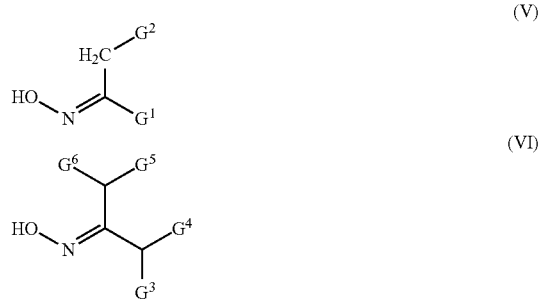

wherein:
G$^1$ is a hydrogen atom or a linear or branched alkyl radical having from 1 to 4 carbon atoms;
G$^2$ is a hydrogen atom or a radical selected from a linear or branched alkyl radical having from 1 to 10 carbon atoms, a linear or branched alkenyl radical having from 2 to 10 carbon atoms, a cyclic alkyl radical having from 3 to 10 carbon atoms, an aryl radical or a radical —N(G$^7$G$^8$) where G$^7$ and G$^8$ independently represent a linear or branched alkyl radical having from 1 to 10 carbon atoms or a linear or branched alkenyl radical having from 2 to 10 carbon atoms or a benzyl radical;
G$^3$ represents either a hydrogen atom or an alkyl group having from 1 to 4 carbon atoms, or forms the remainder of an aliphatic ring having between 4 and 14 carbon atoms with the groups G$^4$ and/or G$^5$ and/or G$^6$, said aliphatic ring optionally comprising one or more heteroatoms and/or one or more double bonds and said aliphatic ring being optionally substituted by one or more alkyl groups having from 1 to 4 carbon atoms,
G$^4$ represents either a hydrogen atom or an alkyl group having from 1 to 4 carbon atoms, or forms the remainder of an aliphatic ring having between 4 and 14 carbon atoms with the groups G$^3$ and/or G$^5$ and/or G$^6$, said aliphatic ring optionally comprising one or more heteroatoms and/or one or more double bonds and said aliphatic ring being optionally substituted by one or more alkyl groups having from 1 to 4 carbon atoms,
it being understood that at least one of the groups G$^3$ or G$^4$ forms the remainder of an aliphatic ring with at least one of the groups G$^5$ or G$^6$;

G$^5$ represents either a hydrogen atom or an alkyl group having from 1 to 4 carbon atoms, or forms the remainder of an aliphatic ring having between 4 and 14 carbon atoms with the groups G$^3$ and/or G$^4$ and/or G$^6$, said aliphatic ring optionally comprising one or more heteroatoms and/or one or more double bonds and said aliphatic ring being optionally substituted by one or more alkyl groups having from 1 to 4 carbon atoms,
G$^6$ represents either a hydrogen atom or an alkyl group having from 1 to 4 carbon atoms, or forms the remainder of an aliphatic ring having between 4 and 14 carbon atoms with the groups G$^3$ and/or G$^4$ and/or G$^5$, said aliphatic ring optionally comprising one or more heteroatoms and/or one or more double bonds and said aliphatic ring being optionally substituted by one or more alkyl groups having from 1 to 4 carbon atoms,
it being understood that at least one of the groups G$^5$ or G$^6$ forms the remainder of an aliphatic ring with at least one of the groups G$^3$ or G$^4$.

For the purposes of the present invention, the expression "adhesive composition" also relates to mastic compositions or surface coating compositions.

The composition according to the invention is curable in the presence of moisture or after moistening.

Silylated Polymer (A)

For the purposes of the present invention, silylated polymer means a polymer having at least one alkoxysilane group. Preferably, the silylated polymer having at least one alkoxysilane group is a polymer comprising at least one, preferably at least two groups of formula (I):

wherein:
R$^4$ represents a linear or branched alkyl radical having from 1 to 4 carbon atoms, it being possible that when there are several radicals R$^4$, the latter are identical or different;
R$^5$ represents a linear or branched alkyl radical having from 1 to 4 carbon atoms, it being possible that when there are several radicals R$^5$, the latter are identical or different, it being possible that two groups OR$^5$ may be engaged in the same ring;
p is an integer equal to 0, 1 or 2, preferably equal to 0 or 1.

The silylated polymer as defined above comprises at least one cross-linkable alkoxysilyl group. The cross-linkable alkoxysilyl group is preferably positioned at the end of said polymer. However, mid-chain positioning is not excluded. The silylated polymer is not cured before the adhesive composition is applied. The adhesive composition is applied under conditions allowing it to cure.

The silylated polymer (A) is generally in the form of a relatively viscous liquid. Preferably, the silylated polymer has a viscosity ranging from 10 to 200 Pa·s, preferably ranging from 20 to 175 Pa·s, said viscosity being for example measured using a Brookfield method at 23° C. and 50% relative humidity (spindle S28).

The silylated polymer (A) preferably comprises two groups of formula (I), but it may also comprise three to six groups of formula (I).

Preferably, the silylated polymer(s) (A) has/have an average molar mass ranging from 500 to 50000 g/mol, more preferably from 700 to 20000 g/mol. The molar mass of the polymers can be measured by methods well known to the skilled person, for example by NMR and size-exclusion chromatography using polystyrene standards.

According to one embodiment of the invention, the silylated polymer (A) corresponds to one of the formulae (II), (III) or (IV):

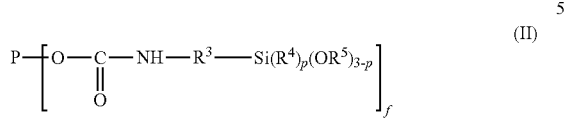

(II)

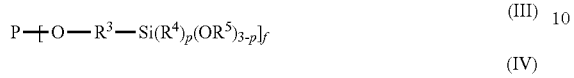

(III)

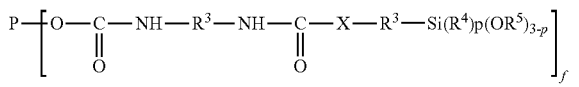

(IV)

wherein:
$R^4$, $R^5$ and p have the same meaning as in the formula (I) described above, P represents a saturated or unsaturated, linear or branched polymer radical optionally comprising one or more heteroatoms, such as oxygen, nitrogen, sulphur, silicon, and preferably having a number-average molar mass ranging from 100 g/mol to 48600 g/mol, more particularly from 300 g/mol to 18600 g/mol or even from 500 g/mol to 12600 g/mol, $R^1$ represents a divalent hydrocarbon radical having from 5 to 15 carbon atoms which may be aromatic or aliphatic, linear, branched or cyclic, $R^3$ represents a linear or branched divalent alkylene radical having from 1 to 6 carbon atoms, preferably from 1 to 3 carbon atoms, X represents a divalent radical selected from —NH—, —NR$^7$— or —S—, $R^7$ represents a linear or branched alkyl radical having from 1 to 12 carbon atoms, f is an integer ranging from 1 to 6, preferably ranging from 2 to 5, more preferably ranging from 2 to 3.

Preferably, in the above formulae (II), (III) and/or (IV), P represents a polymer radical selected from, but not limited to, polyethers, polycarbonates, polyesters, polyolefins, polyacrylates, polyether polyurethanes, polyester polyurethanes, polyolefin polyurethanes, polyacrylate polyurethanes, polycarbonate polyurethanes, polyether/polyester block polyurethanes.

For example, the document EP 2468783 describes silylated polymers of formula (II) wherein P represents a polymer radical with polyurethane/polyester/polyether blocks.

According to one embodiment, the silylated polymers are selected from silylated polyurethanes, silylated polyethers, and mixtures thereof.

According to a particular embodiment, the silylated polymer corresponds to one of the formulae (II'), (III') or (IV'):

In the formulae (II'), (III') or (IV'):
$R^1$, $R^3$, $R^4$, $R^5$, X, $R^7$ and p have the same meaning as in the formulae (II), (III) and (IV) described above, $R^2$ represents a saturated or unsaturated, linear or branched divalent hydrocarbon radical optionally comprising one or more heteroatoms, such as oxygen, nitrogen, sulphur, silicon, and preferably having a number-average molar mass ranging from 100 g/mol to 48600 g/mol, more particularly from 300 g/mol to 18600 g/mol or even from 500 g/mol to 12600 g/mol, n is an integer greater than or equal to 0, preferably ranging from 1 to 10.

In the silylated polymers of formulae (II'), (III') or (IV') defined above, when the radical $R^2$ contains one or more heteroatoms, said one or more heteroatoms are not present at the end of the chain. In other words, the free valences of the divalent radical $R^2$ bound to the oxygen atoms adjacent to the silylated polymer each come from a carbon atom. Thus, the main chain of the radical $R^2$ is terminated by a carbon atom at each of the two ends, said carbon atom then having a free valence.

According to one embodiment, the silylated polymers (A) are obtained from polyols selected from polyether polyols, polyester polyols, polycarbonate polyols, polyacrylate polyols, polysiloxane polyols and polyolefin polyols and mixtures thereof, and preferably from diols selected from polyether diols, polyester diols, polycarbonate diols, polyacrylate diols, polysiloxane diols, polyolefin diols and mixtures thereof. In the case of polymers of formulae (II'), (III') or (IV') described above, such diols may be represented by the formula HO—$R^2$—OH where $R^2$ has the same meaning as in the formulae (II'), (III') or (IV').

For example, among the radicals of type $R^2$ that may be present in the formulae (II'), (III') or (IV'), mention may be made of the following divalent radicals whose formulae below show the 2 free valences:

derived from a polypropylene glycol:

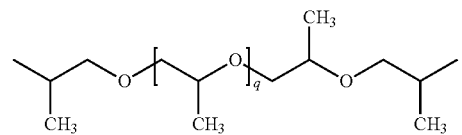

derived from a polyester diol:

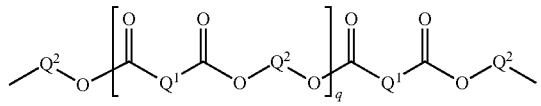

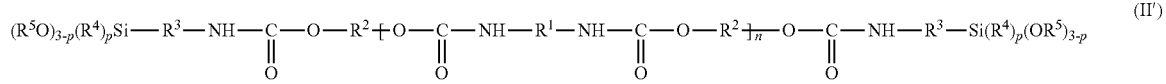

(II')

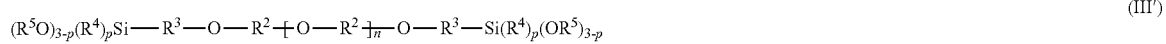

(III')

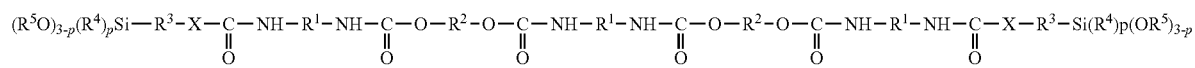

(IV')

derived from a polybutadiene diol:

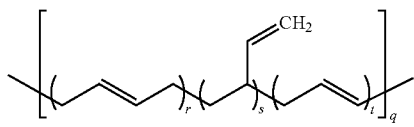

derived from a polyacrylate diol:

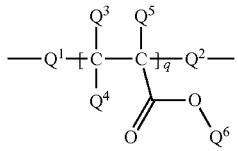

derived from a polysiloxane diol:

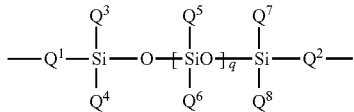

wherein:

q represents an integer such that the number-average molar mass of the radical $R^2$ ranges from 100 g/mol to 48600 g/mol, preferably from 300 g/mol to 18600 g/mol, more preferably from 500 g/mol to 12600 g/mol, r, s and t, represent zero or a non-zero integer such that the number-average molar mass of the radical $R^2$ ranges from 100 g/mol to 48600 g/mol, preferably from 300 g/mol to 18600 g/mol, more preferably from 500 g/mol to 12600 g/mol, it being understood that the sum r+s+t is not zero, $Q^1$ represents a linear or branched, saturated or unsaturated, aromatic or aliphatic divalent alkylene radical preferably having from 1 to 18 carbon atoms, more preferably from 1 to 8 carbon atoms, $Q^2$ represents a linear or branched divalent alkylene radical preferably having from 2 to 36 carbon atoms, more preferably from 1 to 8 carbon atoms, $Q^3$, $Q^4$, $Q^5$, $Q^6$, $Q^7$ and $Q^8$ independently represent a hydrogen atom or an alkyl, alkenyl or aromatic radical, preferably having from 1 to 12 carbon atoms, preferably from 2 to 12 carbon atoms, more preferably from 2 to 8 carbon atoms.

According to one embodiment, $R^1$ is selected from one of the following divalent radicals whose formulae below show the 2 free valences:

a) the divalent radical derived from isophorone:

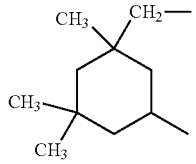

b)

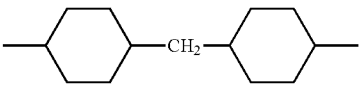

c)

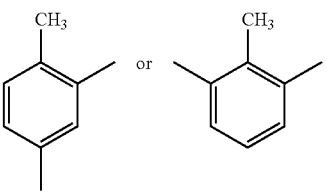

d)

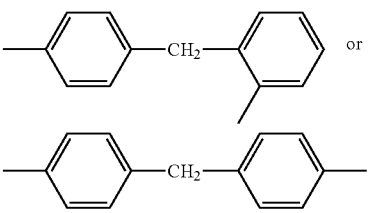

e) —$(CH_2)_6$— (or hexamethylene radical)

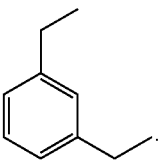

The polymers of formula (II) or (II') may be obtained by a method described in the documents EP 2336208 and WO 2009/106699. The skilled person will be able to adapt the production method described in those two documents when using different types of polyols. Among the polymers corresponding to the formula (II), mention may be made of:

GENIOSIL® STP-E10 (available from Wacker): polyether comprising two dimethoxy-type groups (I) (n equal to 0, p equal to 1 and $R^4$ and $R^5$ represent a methyl group) having a number-average molar mass of 8889 g/mol where $R^3$ represents a methyl group;

GENIOSIL® STP-E30 (available from Wacker): polyether comprising two dimethoxy-type groups (I) (n equal to 0, p equal to 1 and $R^4$ and $R^5$ represent a methyl group) having a number-average molar mass of 14493 g/mol where $R^3$ represents a methyl group;

SPUR+® 1050MMM (available from Momentive): polyurethane comprising two trimethoxy-type groups (I) (n not equal to 0, p equal to 0 and $R^5$ represents a methyl group) having a number-average molar mass of 16393 g/mol where $R^3$ represents an n-propyl group;

SPUR+® Y-19116 (available from Momentive): polyurethane comprising two trimethoxy-type groups (I) (n not equal 0 and $R^5$ represents a methyl group) having a number-average molar mass ranging from 15000 to 17000 g/mol where $R^3$ represents an n-propyl group;

DESMOSEAL® S XP 2636 (available from Bayer): polyurethane comprising two trimethoxy-type groups (I) (n not equal to 0, p equal to 0 and $R^5$ represents a methyl group) having a number-average molar mass of 15038 g/mol where $R^3$ represents an n-propylene group.

The polymers of formula (III) or (III') may be obtained by hydrosilylation of polyether diallylether according to a method described for example in the document EP 1829928. Among the polymers corresponding to the formula (III), mention may be made of:

the polymer MS SAX® 350 (available from Kaneka) corresponding to a polyether comprising two dimethoxy-type groups (I) (p equal to 1 and $R^4$ represents a methyl group) having a number-average molar mass ranging from 14000 to 16000 dalton;

the polymer MS SAX® 260 (available from Kaneka) corresponding to a polyether comprising two dimethoxy-type groups (I) (p equal to 1, $R^4$ and $R^5$ represent a methyl group) having a number-average molar mass of 16000 to 18000 g/mol where $R^3$ represents an ethyl group.

The polymers of formula (IV) or (IV') may, for example, be obtained by reaction of polyol(s) with diisocyanate(s) followed by a reaction with aminosilanes or mercaptosilanes. A method for preparing polymers of formula (IV) or (IV') is described in the document EP 2 583 988. The skilled person will be able to adapt the production method described in that document when using different types of polyols.

According to a preferred embodiment of the invention, the adhesive composition comprises at least one silylated polymer of formula (II) and/or (II') or at least one silylated polymer of formula (III) and/or (III').

According to one embodiment, the adhesive composition comprises a mixture of at least two different silylated polymers (A). For the purposes of the present invention, "different silylated polymers" means two polymers which differ either in molecular mass or in structure.

Thus, the adhesive composition may comprise a mixture of at least two different polymers of formula (II), a mixture of at least two polymers of formula (III) or a mixture of at least two polymers of formula (IV). The adhesive composition may also comprise a mixture of at least two polymers of different formulae selected from the formulae (II), (III) and (IV).

According to one embodiment of the invention, the silylated polymer (A) used in the adhesive composition according to the invention corresponds to the formula (VII):

where P' represents a polysiloxane preferably having a number-average molar mass ranging from 100 g/mol to 48600 g/mol, more particularly from 300 g/mol to 18600 g/mol or even from 500 g/mol to 12600 g/mol, where f is an integer ranging from 1 to 6, preferably ranging from 2 to 5, more preferably ranging from 2 to 3, and where $R^4$, $R^5$ and p have the same meaning as in the formula (I) described above.

According to a particular embodiment, the silylated polymer (A) according to the invention is different from a polysiloxane-type silicone polymer, in particular is different from the polymer of formula (VII) described above where P' is a polysiloxane.

According to one embodiment of the invention, all the silylated polymers of the adhesive composition are selected from the polymers of formula (II), (III) or (IV) as defined above, preferably from the polymers of formula (II'), (III') or (IV') as defined above.

The polymers of formulae (II), (III) and (IV) or of formula (II'), (III') and (IV') are preferred to the polymers of formula (VII) since they allow better adhesion to wood, for example.

The silylated polymer(s) (A) may represent at least 5% by weight, preferably at least 10% by weight, more preferably at least 15% by weight, of the total weight of the adhesive composition. Generally, the content of silylated polymer(s) in the adhesive composition is preferably less than or equal to 90% by weight, more preferably less than or equal to 80% by weight, even more preferentially less than or equal to 70% by weight, advantageously less than or equal to 60% by weight, based on the total weight of the adhesive composition.

The amount of silylated polymers (A) in the adhesive composition may depend on the use of said adhesive composition. Indeed, for a putty composition, the adhesive composition will preferably comprise from 5 to 50% by weight of silylated polymers, preferably from 10 to 40% by weight of silylated polymers, based on the total weight of the adhesive composition. For an adhesive composition used for the formulation of pressure-sensitive adhesive (PSA) items, the adhesive composition will preferably comprise from 10 to 99.9% by weight, preferably from 15 to 90% by weight, more preferably from 20 to 80% by weight, of silylated polymers, based on the total weight of the adhesive composition.

Curing Catalysts (B)

The catalysts (B) are intended for the curing of the silylated polymer (A). The catalysts (B) defined in the present invention are stable, in particular during storage of the adhesive composition. Thus, during storage of the adhesive composition, the polymer (A) is in curable (uncured) form. The curing of the silylated polymer (A) occurs when the adhesive composition is applied to a surface to provide bonding or to form a coating or seal.

The catalyst (B) used in the present invention is a metal compound obtained by reaction:

of at least one metal alkoxide,
with at least one oxime selected from an oxime of formula (V) or an oxime of formula (VI):

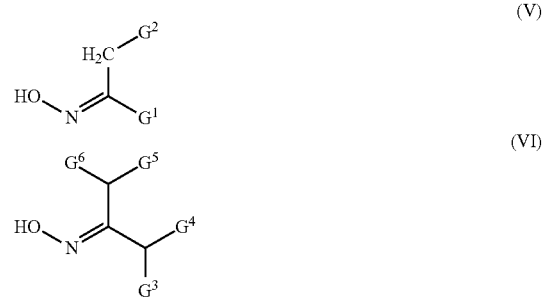

wherein:

$G^1$ is a hydrogen atom or a linear or branched alkyl radical having from 1 to 4 carbon atoms;

$G^2$ is a hydrogen atom or a radical selected from a linear or branched alkyl radical having from 1 to 10 carbon atoms, a linear or branched alkenyl radical having from 2 to 10 carbon atoms, a cyclic alkyl radical having from 3 to 10 carbon atoms, an aryl radical or a radical —N($G^7G^8$) where $G^7$ and $G^8$ independently represent a linear or branched alkyl radical having from 1 to 10 carbon atoms or a linear or branched alkenyl radical having from 2 to 10 carbon atoms or a benzyl radical;

$G^3$ represents either a hydrogen atom or an alkyl group having from 1 to 4 carbon atoms, or forms the remainder of an aliphatic ring having between 4 and 14 carbon atoms with the groups $G^4$ and/or $G^5$ and/or $G^6$, said aliphatic ring optionally comprising one or more heteroatoms and/or one or more double bonds and said aliphatic ring being optionally substituted by one or more alkyl groups having from 1 to 4 carbon atoms, $G^4$ represents either a hydrogen atom or an alkyl group having from 1 to 4 carbon atoms, or forms the remainder of an aliphatic ring having between 4 and 14 carbon atoms with the groups $G^3$ and/or $G^5$ and/or $G^6$, said aliphatic ring optionally comprising one or more heteroatoms and/or one or more double bonds and said aliphatic ring being optionally substituted by one or more alkyl groups having from 1 to 4 carbon atoms, it being understood that at least one of the groups $G^3$ or $G^4$ forms the remainder of an aliphatic ring with at least one of the groups $G^5$ or $G^6$;

$G^5$ represents either a hydrogen atom or an alkyl group having from 1 to 4 carbon atoms, or forms the remainder of an aliphatic ring having between 4 and 14 carbon atoms with the groups $G^3$ and/or $G^4$ and/or $G^6$, said aliphatic ring optionally comprising one or more heteroatoms and/or one or more double bonds and said aliphatic ring being optionally substituted by one or more alkyl groups having from 1 to 4 carbon atoms, $G^6$ represents either a hydrogen atom or an alkyl group having from 1 to 4 carbon atoms, or forms the remainder of an aliphatic ring having between 4 and 14 carbon atoms with the groups $G^3$ and/or $G^4$ and/or $G^5$, said aliphatic ring optionally comprising one or more heteroatoms and/or one or more double bonds and said aliphatic ring being optionally substituted by one or more alkyl groups having from 1 to 4 carbon atoms, it being understood that at least one of the groups $G^5$ or $G^6$ forms the remainder of an aliphatic ring with at least one of the groups $G^3$ or $G^4$.

The structure of the catalysts (B) according to the invention may, for example, be determined by X-ray diffraction.

It seems that the reaction between the metal alkoxide and the oxime can be represented by the following schematic equation:

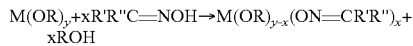

$$M(OR)_y + xR'R''C{=}NOH \rightarrow M(OR)_{y-x}(ON{=}CR'R'')_x + xROH$$

where $M(OR)_y$ represents the metal alkoxide, y is equal to 3 for trivalent metals and y is equal to 4 for tetravalent metals, R'R''C=NOH represents the oxime, x is a number ranging from 1 to 4 for tetravalent metals and x is a number ranging from 1 to 3 for trivalent metals.

Without wishing to be bound by any theory, the inventors discovered that a compound comprising at least one "M—O—N" type bond where M represents a metal atom, O represents an oxygen atom and N represents a nitrogen atom, had excellent catalytic properties (while being stable) in a composition comprising curable silylated polymers.

For the purposes of the present invention, an "alkyl" group represents a saturated hydrocarbon chain, optionally comprising one or more heteroatoms. Preferably, the "alkyl" groups defined in the present invention are composed solely of carbon and hydrogen atoms.

For the purposes of the present invention, "aliphatic ring" means a ring that is not aromatic.

For the purposes of the present invention, "heteroatoms" means an atom selected from oxygen, nitrogen, sulphur or silicon, preferably selected from oxygen, nitrogen, sulphur.

The metal alkoxide may, for example, be in the form $M(OR)_y$ where

M represents a metal atom, preferably selected from titanium, zirconium, aluminium, silicon, hafnium, barium, cerium or antimony, y is equal to 3 or 4 (y is equal to 3 for trivalent metals and y is equal to 4 for tetravalent metals), and R represents a linear or branched alkyl or alkenyl, preferably alkyl, group having from 1 to 5 carbon atoms, preferably from 2 to 4 carbon atoms, preferably from 3 to 4 carbon atoms.

Thus, the metal alkoxide may, for example, be selected from titanium, zirconium, aluminium, silicon, hafnium, barium, cerium or antimony alkoxides.

According to one embodiment of the invention, the metal alkoxide is selected from titanium alkoxides and zirconium alkoxides. Preferably, the titanium or zirconium alkoxide is selected from the following compounds: $Ti(OiPr)_4$, $Ti(OnPr)_4$, $Ti(OnBu)_4$, $Zr(OiPr)_4$, $Zr(OnPr)_4$, $Zr(OnBu)_4$ where:

"iPr" represents an iso-propyl (—$CH(CH_3)_2$) group,

"nPr" represents an n-propyl (—$CH_2CH_2CH_3$) group,

"nBu" represents an n-butyl (—$CH_2$—$CH_2$—$CH_2$—$CH_3$) group.

According to a particular embodiment of the invention, the alkoxide is a titanium alkoxide, preferably of type $Ti(OiPr)_4$, $Ti(OnPr)_4$, $Ti(OnBu)_4$, more preferably of type $Ti(OnBu)_4$.

According to one embodiment of the invention, in the formula (V), $G^1$ preferably represents a methyl group or an ethyl group, more preferably a methyl group.

According to one embodiment of the invention, in the formula (V), $G^2$ preferably represents hydrogen or a linear or branched alkyl group having from 1 to 8 carbon atoms, preferably from 1 to 6 carbon atoms, more preferably from 1 to 4 carbon atoms, or a phenyl group, or a group —$N(G^7G^8)$ where $G^7$ and $G^8$ preferably represent a methyl, ethyl, propyl, butyl, pentyl or benzyl (—$CH_2$—$C_6H_5$) group, more preferably a methyl, ethyl, propyl or benzyl group.

The oxime of formula (VI) may be monocyclic or polycyclic, preferably monocyclic.

For example, in the case of a polycyclic oxime of formula (VI), when $G^3$ forms a ring with $G^5$ or $G^6$ and when $G^4$ forms a ring with $G^5$ or $G^6$ and when $G^3$ and $G^4$ (and $G^5$ and $G^6$) are engaged in the same ring then the oxime has a tricyclic structure, for example of the adamantane or norbornene type.

According to one embodiment of the invention, in the formula (VI), $G^3$ and $G^6$ each preferably represent a hydrogen atom, and/or $G^4$ and $G^5$ form a preferably saturated aliphatic ring having from 4 to 14 carbon atoms, preferably from 5 to 11 carbon atoms, more preferably 6 carbon atoms, said ring being optionally substituted by one or more methyl, ethyl and/or propyl groups and said ring optionally comprising one or more heteroatoms selected from an oxygen atom, a sulphur atom or a nitrogen atom, said nitrogen atom then not being bound to a hydrogen atom.

Examples of oximes of formula (VI) include cyclohexanone oxime, cyclododecanone oxime.

According to a particular embodiment of the invention, the catalyst (B) is obtained by reaction:
of an alkoxide selected from the following compounds: Ti(OiPr)$_4$, Ti(OnPr)$_4$, Ti(OnBu)$_4$, Zr(OiPr)$_4$, Zr(OnPr)$_4$, Zr(OnBu)$_4$;
and an oxime selected from the oximes of formula (V-1) and the oximes of formula (VI-1):

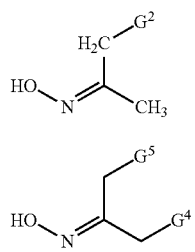

(V-1)

(VI-1)

wherein:
G$^2$ represents H or a methyl, ethyl, iso-propyl, n-propyl, n-butyl, iso-butyl, —N(CH$_2$—C$_6$H$_5$)$_2$ group;
G$^4$ and G$^5$ form a saturated aliphatic ring having from 5 to 11 carbon atoms.

According to a particular embodiment of the invention, the catalyst (B) is selected from the following catalysts:
product of the reaction between an alkoxide of formula Ti(OnBu)$_4$ and 2-butanone oxime,
product of the reaction between an alkoxide of formula Ti(OnBu)$_4$ and 4-methyl-2-pentanone oxime,
product of the reaction between an alkoxide of formula Ti(OnBu)$_4$ and cyclohexanone oxime,
product of the reaction between an alkoxide of formula Ti(OnPr)$_4$ and the 3-(dibenzylamino)-2-propanone oxime of formula:

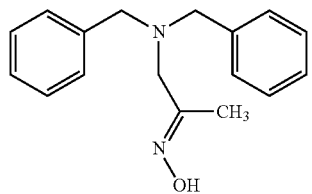

product of the reaction between an alkoxide of formula Zr(OnPr)$_4$ and cyclohexanone oxime.

According to one embodiment of the invention, the catalyst (B) is obtained by reaction of the alkoxide with the oxime in an alkoxide:oxime molar ratio ranging from 1:1 to 1:4, preferably ranging from 1:2 to 1:4. This embodiment is particularly preferred in the case of tetravalent metals (metal alkoxide). In the case of trivalent metals, the alkoxide:oxime molar ratio preferably ranges from 1:1 to 1:3 and more preferably from 1:2 to 1:3.

The catalyst (B) may represent at least 0.05% by weight, preferably from 0.1 to 10% by weight, preferably from 0.5 to 5% by weight, of the total weight of the adhesive composition.

The amount of catalyst in the adhesive composition may be varied in order to modulate the curing time according to the intended applications. Thus, for a so-called "fast-setting" adhesive composition, it will be preferable to have a short curing time, while for a so-called "slow-setting" adhesive composition, it will be preferable to have a longer curing time.

The adhesive composition according to the invention may comprise a mixture of at least two different catalysts (B), in particular two catalysts (B) differing by the nature of the metal, by the nature of the alkoxide and/or by the nature of the oxime.

The catalyst (B) may be obtained by simply mixing the alkoxide with the oxime.

Preferably, the alkoxide is mixed with the oxime at room temperature (about 23° C.) at atmospheric pressure (about 1 bar).

During the preparation of the catalyst (B) according to the invention, it is possible to add a solvent in order to solubilize the oxime and the alkoxide. Such a solvent may, for example, be a polar solvent not containing an alcohol group of the R—OH type where R is a hydrocarbon group, said solvent may, for example, be selected from tetrahydrofuran (THF), ethyl acetate, methylethylketone.

Of course, care should be taken to ensure that the reaction between the metal alkoxide and the oxime takes place in the absence of any other reagent that may disturb, alter or compete with said reaction, thus avoiding the use of complementary reagents that may lead to undesirable products or to products not having the advantageous properties attached to the present invention, as may be the case, for example, if the reaction takes place in the presence of alkoxysilane-type compounds. Indeed, in the presence of an alkoxysilane-type compound as described in the document U.S. Pat. No. 4,956,435, a transalkoxylation reaction of the alkoxy functions of the alkoxysilane by the hydroxyl function of the oxime then occurs. Thus, the adhesive composition, and in particular the catalyst, described in that document is different from the adhesive composition, and in particular from the catalyst, described in the present invention.

Thus, according to a preferred embodiment, the adhesive composition according to the invention is substantially free, preferably totally free, of free oxime. The expression "free oxime" must be understood to mean an oxime-type compound, such as a compound of formula (V) or (VI) described in the present invention.

The alkoxide and the oxime are commercially available products. Examples of preparation of catalysts (B) are given in the experimental section.

Other Additives (C)

The adhesive composition according to the invention may comprise other additive(s) (C).

"Other additives" means additives that are neither silylated polymers (A) nor catalysts (B) as defined above.

Examples of other additives include fillers, adhesion promoters, plasticizers, rheological agents, moisture absorbers, UV and thermal stabilizers, co-catalysts (different from the catalyst (B) defined in the present invention).

The adhesive composition according to the invention may further comprise at least one co-catalyst (or cross-linker), different from the catalyst (B). The co-catalyst(s) may be selected from silicates having, for example, one or more hydrolyzable groups, preferably the co-catalyst is tetraethylorthosilicate. The use of a co-catalyst may improve the curing rate in some cases.

The adhesive composition according to the invention may comprise fillers, which may be inorganic fillers, organic fillers or a mixture of inorganic and organic fillers.

Inorganic fillers may be selected from calcium carbonates, calcium polycarbonates, aluminium hydroxide, talc, kaolins, carbon black, silica and silica fume, quartz, glass beads.

Organic fillers may be selected from polyvinyl chloride, polyethylene, polyamide, styrene-butadiene resins, or any other organic polymer in powder form.

Preferably, the fillers have a particle size ranging from 0.010 to 20 μm, preferably ranging from 0.020 to 15 μm, more preferably ranging from 0.030 to 5 μm.

The fillers present in the adhesive composition may perform different functions within the composition, for example a rheological agent function.

Fillers may represent up to 80% by weight, preferably from 20 to 70% by weight, more preferably from 30 to 60% by weight, of the total weight of the adhesive composition.

Additives may be provided to adjust the rheology of the adhesive composition according to the application requirements. For example, an additive increasing the flow threshold (rheological agent) may be added to avoid running when the composition is applied, especially when the surface receiving the adhesive composition layer is not horizontal.

Rheological agent(s) may represent 0.01 to 8% by weight, preferably from 0.05 to 6% by weight, preferably from 0.1 to 5% by weight, of the total weight of the adhesive composition.

The plasticizer may, for example, be selected from esters of benzoic acid, phthalic acid, trimellitic acid, pyromellitic acid, adipic acid, sebacic acid, fumaric acid, maleic acid, itaconic acid or citric acid or from derivatives of polyester, polyether or hydrocarbon mineral oil. Phthalic acid derivatives include phthalates, such as dibutyl phthalate, dioctyl phthalate, dicyclohexyl phthalate, diisooctyl phthalate, diisodecyl phthalate, dibenzyl phthalate or butylbenzyl phthalate. If the plasticizer is present, it is preferably selected from phthalates, sebacates, adipates and benzoates.

The plasticizer must be compatible with the polymer and not demix in the adhesive composition. The plasticizer increases the plasticity (elongation) of the composition and reduces its viscosity.

When a plasticiser is present in the composition, its content is preferably less than or equal to 5% by weight, preferably less than or equal to 3% by weight, based on the total weight of the adhesive composition. When present, the plasticizer represents from 0.1 to 5% by weight or preferably 0.5 to 3% by weight of the total weight of the adhesive composition.

The moisture absorber, if present, may be selected from vinyltrimethoxysilane (VTMO) such as SILQUEST® A171 available from MOMENTIVE, vinyltriethoxysilane (VTEO) such as GENIOSIL® GF 56 available from WACKER or alkoxyarylsilanes such as GENIOSIL® XL 70 available from WACKER.

The moisture absorber, in addition to neutralizing any water present in the adhesive composition, via additives for example, slightly increases the curing rate of the adhesive composition when it would be too fast for the targeted applications.

When a moisture absorber is present in the composition, its content is preferably less than or equal to 3% by weight, more preferably less than or equal to 2% by weight, based on the total weight of the adhesive composition. When present, the moisture absorber is present in an amount of 0.5 to 3% by weight and preferably from 1 to 2% by weight of the total weight of the adhesive composition. If present in too large an amount, the moisture absorber may cause the curing time of the adhesive composition to increase.

UV and thermal stabilizers may be added in order to prevent (slow down or stop) degradation of the polymer for better UV or thermal shock resistance. Examples include TINUVIN® 123, TINUVIN® 326 or IRGANOX® 245 available from BASF.

An example of an adhesion promoter is aminosilanes. In particular, aminosilanes improve the curing of silylated polymers of formula (II) or (II') or (IV) or (IV'). In the case of silylated polymer of formula (III) or (III'), it will be preferable that the adhesive composition does not comprise aminosilanes.

Adhesive Composition

According to a particular embodiment of the invention, the adhesive composition comprises as silylated polymers the silylated polymers of formulae (II) or (IV) as described above and as catalyst at least one compound selected from:
  the product of the reaction between an alkoxide of formula Ti(OnBu)$_4$ and butanone oxime,
  the product of the reaction between an alkoxide of formula Ti(OnBu)$_4$ and 4-methyl-2-pentanone oxime,
  the product of the reaction between an alkoxide of formula Ti(OnPr)$_4$ and the 3-(dibenzylamino)-2-propanone oxime of formula:

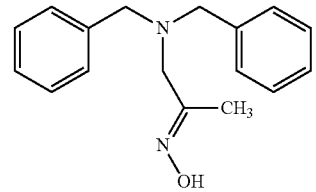 [SMILES: C/C(CN(Cc1ccccc1)Cc1ccccc1)=N\O]

the product of the reaction between an alkoxide of formula Zr(OnPr)$_4$ and cyclohexanone oxime.

According to another particular embodiment of the invention, the adhesive composition comprises as silylated polymers the silylated polymers of formula (III) as described above and as catalyst at least one compound selected from:
  the product of the reaction between an alkoxide of formula Ti(OnBu)$_4$ and butanone oxime,
  the product of the reaction between an alkoxide of formula Ti(OnBu)$_4$ and 4-methyl-2-pentanone oxime,
  the product of the reaction between an alkoxide of formula Ti(OnPr)$_4$ and the 3-(dibenzylamino)-2-propanone oxime of formula:

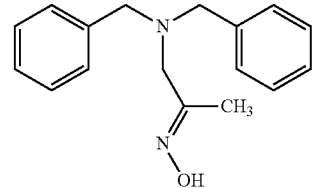 [SMILES: C/C(CN(Cc1ccccc1)Cc1ccccc1)=N\O]

According to one embodiment of the invention, the adhesive composition comprises:
  from 5 to 90% by weight, preferably from 10 to 70% by weight, more preferably from 15 to 60% by weight, of at least one silylated polymer (A),
  from 0.05 to 10% by weight, preferably from 0.1 to 10% by weight, more preferably from 0.1 to 5% by weight, of at least one catalyst (B),
based on the total weight of the adhesive composition.

According to a particular embodiment of the invention, the adhesive composition comprises, in particular consists of:

from 5 to 90% by weight, preferably from 10 to 70% by weight, more preferably from 15 to 60% by weight, of at least one silylated polymer (A), from 0.05 to 10% by weight, preferably from 0.1 to 10% by weight, more preferably from 0.1 to 5% by weight, of at least one catalyst (B), from 0.05 to 10% by weight, preferably from 0.1 to 10% by weight, more preferably from 0.1 to 5% by weight, of at least one co-catalyst, based on the total weight of the adhesive composition.

According to a particular embodiment of the invention, the adhesive composition comprises, in particular consists of:

from 5 to 90% by weight, preferably from 10 to 70% by weight, more preferably from 15 to 60% by weight, of at least one silylated polymer (A), from 0.05 to 10% by weight, preferably from 0.1 to 10% by weight, more preferably from 0.1 to 5% by weight, of at least one catalyst (B), from 10 to 80% by weight, preferably from 20 to 70% by weight, more preferably from 30 to 60% by weight, of at least one filler, based on the total weight of the adhesive composition.

According to a particular embodiment of the invention, the adhesive composition comprises, in particular consists of:

from 5 to 90% by weight, preferably from 10 to 80% by weight, more preferably from 15 to 70% by weight, of at least one silylated polymer (A), from 0.05 to 10% by weight, preferably from 0.1 to 10% by weight, more preferably from 0.1 to 5% by weight, of at least one catalyst (B), from 10 to 80% by weight, preferably from 20 to 70% by weight, more preferably from 30 to 60% by weight, of at least one filler, from 0.05 to 20%, preferably from 0.1 to 15%, more preferably from 0.5 to 10% by weight of at least one other additive selected from co-catalysts, adhesion promoters, plasticizers, moisture absorbers, rheological agents and UV and thermal stabilizers.

based on the total weight of the adhesive composition.

Preferably, the adhesive composition according to the invention has a viscosity ranging from 10000 to 100000 mPa·s, measured at 23° C. with a conventional rheometer using the Bingham model.

The adhesive composition according to the invention is preferably packaged and stored in a moisture-proof cartridge.

According to one embodiment, the adhesive composition according to the invention is in two-component form wherein the silylated polymer (A) and the catalyst (B) are packaged in two separate compartments. According to this embodiment, the compartment comprising the catalyst (B) may optionally comprise water, preferably in an amount ranging from 0.1% to 10% by weight based on the total weight of the adhesive composition according to the invention.

The adhesive composition is not cured before use, for example by application to a substrate. The adhesive composition according to the invention is applied under conditions allowing it to cure. The curing of the adhesive composition results in the creation, between the polymer chains of the silylated polymer described above and under the action of atmospheric moisture, of siloxane bonds which lead to the formation of a three-dimensional polymer network.

The adhesive composition according to the invention may be prepared by mixing the silylated polymer(s) (A) and the catalyst(s) (B) at a temperature ranging from 10° C. to 40° C. and at a relative humidity ranging from 20 to 55% (±5%). When fillers are present in the adhesive composition, the catalyst(s) (B) is/are preferably added in a second step, after mixing the silylated polymer(s) and fillers. Any other additives are introduced in accordance with normal practice.

The adhesive composition according to the invention may be packaged in a kit comprising at least two separate compartments and comprising the adhesive composition according to the invention.

Said kit may comprise water, it being understood that in this case the water and the silylated polymer(s) are packaged in two separate compartments.

Therefore, in such a kit, the adhesive composition according to the invention may be in two-component form wherein the silylated polymer (A) and the catalyst (B) are packaged in two separate compartments. According to this embodiment, the kit may further comprise water, either in the compartment comprising the catalyst (B) or in a third compartment. In the case where water is present in the compartment comprising the catalyst (B), then the water may represent from 0.1% to 10% by weight based on the total weight of the adhesive composition according to the invention.

According to another embodiment, the kit according to the present invention may comprise the adhesive composition in one-component form in one compartment and water in the second compartment. For example, according to this embodiment, the second compartment may comprise an aqueous polyol solution.

Thus, during the application of the adhesive composition, the components of the compartments of the kit according to the invention are mixed in order to allow the silylated polymer(s) to cure.

The present invention also relates to the use of an organometallic compound obtained by reaction:

of at least one metal alkoxide, with at least one oxime selected from an oxime of formula (V) or an oxime of formula (VI): $G^2$

(V)

(VI)

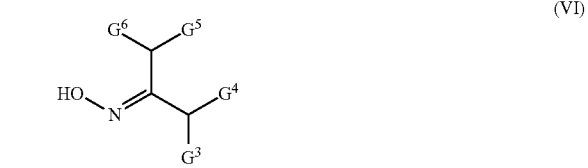

wherein $G^1$, $G^2$, $G^3$, $G^4$, $G^5$ and $G^6$ are as defined in the present invention, as curing catalyst for silylated polymers comprising at least one, preferably at least two groups of formula (I):

$$—Si(R^4)_p(OR^5)_{3-p}$$ (I)

wherein $R^4$, $R^5$ and p are as defined in the present invention.

According to one embodiment of the use:

the catalyst is as defined above for the adhesive composition (catalyst (B)); in particular, the catalyst (B) may have one or more of the features described above for the adhesive composition; and/or the silylated polymer is as defined above for the adhesive composition (silylated polymer (A)); in particular, the silylated polymer (A) may have one or more of the features described above for the adhesive composition.

The present invention also relates to a bonding method comprising applying the adhesive composition according to the invention to a surface and then curing said adhesive composition.

The curing of the adhesive composition is promoted by moisture, particularly by atmospheric moisture.

The adhesive composition according to the invention may be applied to all types of surfaces, such as concrete, tiles, metal, glass, wood and plastics.

EXAMPLES

Ex. 1: Preparation of Adhesive Compositions 1.1. Ingredients
The following ingredients were used:
Silylated Polymer (A):
polymer A1: GENIOSIL® STP-E10 (available from Wacker), polyether corresponding to the formula (II) comprising two dimethoxy-type groups (I) ($m_1$ equal to 0, p equal to 1 and $R^4$ and $R^5$ represent a methyl group) having a number-average molar mass of 8889 g/mol where $R^3$ represents a methyl group;
polymer A2: SAX® 260 (available from Kaneka), polyether corresponding to the formula (III) comprising two dimethoxy-type groups (I) (p equal to 1, $R^4$ and $R^5$ represent a methyl group) having a number-average molar mass of 16000 to 18000 g/mol where $R^3$ represents an ethyl group;
Polymer A3: SAX® 015 (available from Kaneka): polyether corresponding to the formula (III) comprising two dimethoxysilane-type groups (I) with a molar mass comprised between 5000 and 7000 g/mol.
Other Additives (C):
fillers C1: precipitated calcium carbonate with particle sizes less than 500 nm (Calofort® SV chalk, available from Mineral Technologies)
fillers C2: calcium carbonate with a D50% of 1.7 μm,
fillers C3: calcium carbonate with a D50% of 2.5 μm,
plasticizer C4: esters of phthalic acid and isomeric alcohols with 10 carbon atoms,
moisture absorber C5: vinyltrimethoxysilane (VTMO) type.
Metal Alkoxide:
$Zr^{IV}(OnPr)_4$ available from Sigma Aldrich or Dorf Ketal under the trade name Tyzor® NPZ, in a form diluted to 70% in isopropanol;
$Zr^{IV}(OiPr)_4$ available from Sigma Aldrich in solid form without solvent;
$Zr^{IV}(OnBu)_4$ available from Sigma Aldrich or Dorf Ketal under the trade name Tyzor® NBZ, in a form diluted to 80% in butanol;
$Ti^{IV}(OnPr)_4$ available from Sigma Aldrich in 98% pure form (with no particular solvent);
$Ti^{IV}(OiPr)_4$ available from Sigma Aldrich in 97% pure form (with no particular solvent);
$Ti^{IV}(OnBu)_4$ available from Sigma Aldrich or Dorf Ketal under the trade name Tyzor® TnBT, in 97% pure form (with no particular solvent).

1.2. Preparation of Oxime Ligands
1.2.1. Oxime ligands were obtained from a ketone (MIBK, acetone, 2-butanone, 2-pentanone, cyclohexanone) or from an aldehyde (salicylaldehyde) according to the following protocol:
Sodium hydroxide (100 mmol, 4 g) is dissolved in distilled water (10 mL) and a ketone or aldehyde solution (80 mmol) is added. The mixture is cooled to 0° C. and a solution of hydroxylamine hydrochloride (100 mmol, 6.95 g) in distilled water is added slowly under stirring. After one night, the aqueous phase and the organic phase are separated. The aqueous phase is removed and the organic phase (containing the product of interest) is washed with distilled water (2×20 mL). The organic phase is dried under vacuum overnight to afford the oxime ligands from a ketone (MIBK, acetone, 2-butanone, 2-pentanone, cyclohexanone) or from an aldehyde (salicylaldehyde).
1.2.2. Preparation of the Oxime Ligand from a TACO (Triethylamine Adduct of Chloroacetone Oxime) Salt
1.2.2.1. Preparation of the TACO salt: hydroxylamine hydrochloride (182 mmol, 12.65 g) is dissolved in distilled water (80 mL) and a solution of chloroacetone (165.4 mmol, 13.63 mL) in diethyl ether (200 mL) is added. The mixture is cooled to 0° C. and potassium carbonate (91 mmol, 12.57 g) is added slowly under stirring, causing a release of gas. After 2 hours, the aqueous and organic phases are separated and the aqueous phase is extracted with diethyl ether (60 mL). Triethylamine (172 mmol, 24 mL) diluted in acetonitrile (60 mL) is added dropwise to the organic phase and the mixture is stirred for 30 minutes to obtain a white precipitate. The solid is filtered and washed with cold acetonitrile (120 mL). A second precipitation may take place in the filtrate, which is in this case filtered and the resulting solid is also washed with acetonitrile (3×40 mL). The resulting solid(s) is/are combined and dried under vacuum overnight to obtain the TACO salt, in the form of white powder (34.42 g).
1.2.2.2. Preparation of the oxime from the TACO salt: A commercial secondary amine (dibenzylamine—6 mmol) is added to a round-bottomed flask. TACO (6.6 mmol) and acetonitrile (80 mL) are successively added and the mixture is stirred at 85° C. for 6 hours. After cooling, the acetonitrile is evaporated and ethyl acetate is added (30 mL) to precipitate the residual TACO and form an ammonium salt. The mixture is filtered and washed with ethyl acetate (2×14 mL). The organic phases are recovered and combined then evaporated to afford the oxime from TACO.
1.3. Description of the Catalysts
Several catalysts were prepared by mixing metal alkoxide and oxime (monooxime) according to the alkoxide:oxime molar ratios indicated in Table 1 below. In Table 1, the oxime is referred to by the name of the precursor (ketone or salt) used to form said oxime. The catalysts were prepared as follows:
The oxime ligands (from $4.5 \cdot 10^{-4}$ mol (1:1 alkoxide:oxime ratio) to $1.8 \cdot 10^{-3}$ mol (1:4 alkoxide:oxime ratio)) are introduced into a 1 mL tube in 100 μL of solvent (type THF, methylethylketone or ethylacetate) and stirred for 5 minutes. The metal precursors based on zirconium and titanium alkoxide ($4.5 \cdot 10^{-4}$ mol) are added to the same tube and mixed for 1 hour at room temperature (25° C.).

A very schematic representation of the reaction between the metal alkoxide and the oxime is as follows: $M(OR)_4 + xR'R''C=NOH \rightarrow M(OR)_{4-x}(ON=CR''R')_x + xROH$
where $M(OR)_4$ represents the metal alkoxide tested, $R'R''C=NOH$ represents the oxime tested and x is a number ranging from 1 to 4.

TABLE 1

Description of catalysts B1 to B16 according to the invention

| Catalyst | Alkoxide:oxime molar ratio | alkoxide | oxime |
|---|---|---|---|
| B1(1:2) | 1:2 | $Ti^{IV}(OnPr)_4$ | 4-methyl-2-pentanone (MIBK) |
| B1(1:4) | 1:4 | $Ti^{IV}(OnPr)_4$ | MIBK |
| B2(1:2) | 1:2 | $Ti^{IV}(OnPr)_4$ | 2-butanone |
| B2(1:4) | 1:4 | $Ti^{IV}(OnPr)_4$ | 2-butanone |
| B3(1:2) | 1:2 | $Ti^{IV}(OnPr)_4$ | 2-pentanone |
| B3(1:4) | 1:4 | $Ti^{IV}(OnPr)_4$ | 2-pentanone |
| B4(1:2) | 1:2 | $Ti^{IV}(OnBu)_4$ | 2-butanone |
| B4(1:4) | 1:4 | $Ti^{IV}(OnBu)_4$ | 2-butanone |
| B5(1:2) | 1:2 | $Ti^{IV}(OnBu)_4$ | 2-pentanone |
| B5(1:4) | 1:4 | $Ti^{IV}(OnBu)_4$ | 2-pentanone |
| B6(1:2) | 1:2 | $Ti^{IV}(OnBu)_4$ | MIBK |
| B6(1:4) | 1:4 | $Ti^{IV}(OnBu)_4$ | MIBK |
| B7(1:2) | 1:2 | $Zr^{IV}(OnPr)_4$ | acetone |
| B7(1:4) | 1:4 | $Zr^{IV}(OnPr)_4$ | acetone |
| B8(1:2) | 1:2 | $Zr^{IV}(OnPr)_4$ | 2-butanone |
| B8(1:4) | 1:4 | $Zr^{IV}(OnPr)_4$ | 2-butanone |
| B9(1:2) | 1:2 | $Zr^{IV}(OnPr)_4$ | 2-pentanone |
| B9(1:4) | 1:4 | $Zr^{IV}(OnPr)_4$ | 2-pentanone |
| B10(1:2) | 1:2 | $Zr^{IV}(OnPr)_4$ | cyclohexanone |
| B10(1:4) | 1:4 | $Zr^{IV}(OnPr)_4$ | cyclohexanone |
| B11(1:2) | 1:2 | $Zr^{IV}(OnBu)_4$ | acetone |
| B11(1:4) | 1:4 | $Zr^{IV}(OnBu)_4$ | acetone |
| B12(1:2) | 1:2 | $Zr^{IV}(OnBu)_4$ | 2-butanone |
| B12(1:4) | 1:4 | $Zr^{IV}(OnBu)_4$ | 2-butanone |
| B13(1:2) | 1:2 | $Zr^{IV}(OnBu)_4$ | cyclohexanone |
| B13(1:4) | 1:4 | $Zr^{IV}(OnBu)_4$ | cyclohexanone |
| B14(1:2) | 1:2 | $Zr^{IV}(OnBu)_4$ | MIBK |
| B14(1:4) | 1:4 | $Zr^{IV}(OnBu)_4$ | MIBK |
| B15(1:2) | 1:2 | $Ti^{IV}(OnPr)_4$ | TACO |
| B15(1:4) | 1:4 | $Ti^{IV}(OnPr)_4$ | TACO |
| B16(1:2) | 1:2 | $Zr^{IV}(OnPr)_4$ | TACO |
| B16(1:4) | 1:4 | $Zr^{IV}(OnPr)_4$ | TACO |

Other comparative catalysts were tested:
Ref. 1: dibutyltin dilaurate (DBTDL);
Ref. 2: $Zr^{IV}(OnPr)_4$
Ref. 3: $Zr^{IV}(OiPr)_4$
Ref. 4: $Zr^{IV}(OnBu)_4$
Ref. 5: $Ti^{IV}(OnPr)_4$
Ref. 6: $Ti^{IV}(OiPr)_4$
Ref. 7: $Ti^{IV}(OnBu)_4$
Ref. 8: 2-butanone oxime
Ref. 9: cyclohexanone oxime
Ref. 10: TACO oxime
Ref. 11: $Ti^{IV}(OnPr)_4$:salicylaldehyde oxime in a 1:2 molar ratio
Ref. 12: $Ti^{IV}(OnPr)_4$:salicylaldehyde oxime in a 1:4 molar ratio The oximes (Ref. 8 to Ref. 10) are those that were described and prepared according to the protocol described above (section 1.2.1). The catalysts Ref. 11 and Ref. 12 were prepared according to the protocol described above (section 1.3).

Ex. 2: Tests with the Adhesive Compositions Comprising the Silylated Polymer (A1)

Various adhesive compositions comprising the silylated polymer A1 (Geniosil® STPE-10) and various catalysts were prepared and evaluated.

In each adhesive composition, the molar amount of catalyst is $4.5 \times 10^4$ mol. Thus, the amount by weight of catalyst is adjusted according to the molar mass of each catalyst and the amount by weight of polymer A1.

Experimental Protocol for Each Test:

The catalyst ($4.5 \cdot 10^{-4}$ mol) in a solvent of type THF, methyl ethyl ketone or ethyl acetate (100 µL) is added to a 1 mL tube. The mixture is stirred for 1 hour at room temperature (23° C.). The polymer A1 (10 g) is introduced into a plastic container (50 mm in diameter and 30 mm in height). The catalyst is introduced into said plastic container and mixed with the polymer A1 for 1 minute. The curing time is then measured according to the protocol described below.

Curing Time Measurement Test

The curing time (also called skinning time) was evaluated by touching the surface with a probe every 5 minutes for 1 hour and then every 30 minutes up to 4 hours (ambient conditions: 55% relative humidity and 23° C.). The composition was considered uncured when adhesive residues were transferred to the probe when the surface was touched.

Stability Test

The adhesive compositions were prepared according to the same experimental protocol as described above but in a glove box (moisture-free). The plastic containers were left in the glove box for 7 days or 1 month before being replaced under ambient conditions (55% relative humidity and 23° C.) to measure the curing time.

The results are indicated as follows:

A "2" indicates that the adhesive composition is very stable (curing time after storage—7 days or 1 month—identical to the curing time measured immediately after preparation of the adhesive composition), A "1" indicates that the adhesive composition is stable (curing time after storage—7 days or 1 month—different but close to the curing time measured immediately after preparation of the adhesive composition), A "0" indicates that the adhesive composition is not stable (curing time after storage—7 days or 1 month—very different from the curing time measured immediately after preparation of the adhesive composition).

Curing times and stability are shown in Tables 2 and 3 below.

TABLE 2

Results with the adhesive compositions according to the invention

| Catalysts | Curing time | Stability 7 days | 1 months |
|---|---|---|---|
| B1(1:2) | 40 min | 2 | 1 |
| B1(1:4) | 20 min | 2 | 1 |
| B2(1:2) | 14 min | 2 | 2 |
| B2(1:4) | 12 min | 2 | 2 |
| B3(1:2) | 28 min | 0 | 0 |
| B3(1:4) | 30 min | 0 | 0 |
| B4(1:2) | 18 min | 2 | 2 |
| B4(1:4) | 13 min | 2 | 2 |
| B6(1:2) | 14 min | 2 | 1 |
| B6(1:4) | 16 min | 2 | 1 |
| B7(1:2) | 45 min | 2 | 2 |
| B7(1:4) | 16 min | 2 | 2 |
| B8(1:2) | 9 min | 2 | 2 |
| B8(1:4) | 8 min | 2 | 2 |
| B9(1:2) | 11 min | 2 | 1 |
| B9(1:4) | 14 min | 2 | 1 |
| B10(1:2) | 12 min | 2 | 2 |
| B10(1:4) | 11 min | 2 | 2 |
| B11(1:2) | 18 min | 2 | 2 |
| B11(1:4) | 20 min | 2 | 2 |
| B12(1:2) | 10 min | 2 | 2 |
| B12(1:4) | 12 min | 2 | 2 |
| B13(1:2) | 12 min | 2 | 2 |
| B13(1:4) | 13 min | 2 | 2 |

TABLE 2-continued

Results with the adhesive compositions according to the invention

| Catalysts | Curing time | Stability 7 days | 1 months |
|---|---|---|---|
| B14(1:2) | 20 min | 2 | 1 |
| B14(1:4) | 22 min | 2 | 1 |
| B15(1:2) | 10 min | 2 | 2 |
| B15(1:4) | 16 min | 2 | 2 |
| B16(1:2) | 20 min | 2 | 2 |
| B16(1:4) | 25 min | 2 | 2 |

TABLE 3

Results with the comparative adhesive compositions

| Catalysts | Curing time | Stability 7 days | 1 month |
|---|---|---|---|
| Ref. 1 | 3 h 30 min | 2 | 2 |
| Ref. 2 | 30 min | 0 | 0 |
| Ref. 3 | Instant curing | 0 | 0 |
| Ref. 4 | 1 h 30 min | 0 | 0 |
| Ref. 5 | 45 min | 0 | 0 |
| Ref. 6 | Instant curing | 0 | 0 |
| Ref. 7 | 1 h | 0 | 0 |
| Ref. 8 | No curing | — | — |
| Ref. 9 | No curing | — | — |
| Ref. 10 | No curing | — | — |
| Ref. 11 | No curing | — | — |
| Ref. 12 | No curing | — | — |

Stability was not evaluated for the comparative examples Ref. 8 to Ref. 12 as no curing could be obtained.

Table 3 above shows that the adhesive compositions comprising a catalyst based on titanium or zirconium alkoxide (without oxime ligand) are not stable. Indeed, the compositions Ref. 2 to Ref. 7 show curing even in their centre. Table 3 also shows that the adhesive compositions comprising a catalyst based on oxime ligand (without titanium or zirconium alkoxide) do not cure.

In contrast, Table 2 shows that the adhesive compositions according to the invention, i.e. comprising a catalyst based on titanium or zirconium alkoxide and oxime according to the invention, have both good stability and satisfactory curing times.

Thus, the examples show that the catalysts according to the invention obtained from a metal alkoxide and an oxime allow a stability that is better than or identical to the stability of the metal alkoxide alone (without oxime) and/or a curing rate of the same order of magnitude or even higher than that obtained with the corresponding metal alkoxide alone (without oxime).

Ex. 3: Tests with the Adhesive Compositions Comprising the Silylated Polymer (A1) and Precipitated Calcium Carbonate Fillers (C1)

Various adhesive compositions comprising the silylated polymer A1 (Geniosil® STPE-10), calcium carbonate C1 and various catalysts were prepared and evaluated.

The molar amount of catalyst in each adhesive composition is $4.5 \times 10^4$ mol. Thus, the amount by weight of catalyst is adjusted according to the molar mass of each catalyst and the amount by weight of polymer A1 and fillers C1.

Experimental Protocol for Each Test:

The catalyst ($4.5 \cdot 10^{-4}$ mol) in a solvent of type THF, methyl ethyl ketone or ethyl acetate (100 µL) is added to a 1 mL tube. The mixture is stirred for 1 hour at room temperature (23° C.). The polymer A1 (5 g) and the fillers C1 (5 g) are introduced into a plastic container (50 mm in diameter and 30 mm in height) and mixed for 1 minute at 1800 rpm with a speed mixer. The catalyst is introduced into said plastic container and mixed with the mixture (polymer/fillers) for 1 minute. The curing time is then measured according to the protocol described in Example 2.

A vinyltrimethoxysilane (VTMO) type moisture absorber was added to neutralize the amount of water present in the fillers C1. The amount of water present in the fillers C1 was measured using the Karl Fischer method and the amount of VTMO was adjusted to neutralize only the water and not to slow the curing rate. The amount of VTMO may thus vary from 0 to 2000 ppm by weight.

Stability is evaluated in the same way as in Example 2 Curing times and stability are shown in Tables 4 and 5 below.

TABLE 4

Results with the adhesive compositions according to the invention

| Catalysts | Curing time | Stability 7 days | 1 month |
|---|---|---|---|
| B1(1:2) | Instant curing | 2 | 2 |
| B1(1:4) | Instant curing | 2 | 2 |
| B2(1:2) | Instant curing | 2 | 2 |
| B2(1:4) | Instant curing | 2 | 2 |
| B3(1:2) | Instant curing | 2 | 2 |
| B3(1:4) | Instant curing | 2 | 2 |
| B4(1:2) | 1-2 min | 2 | 2 |
| B4(1:4) | 1-2 min | 2 | 2 |
| B5(1:2) | Instant curing - 1 min | 2 | 2 |
| B5(1:4) | Instant curing - 1 min | 2 | 2 |
| B6(1:2) | Instant curing - 1 min | 2 | 2 |
| B6(1:4) | Instant curing - 1 min | 2 | 2 |
| B7(1:2) | 2-3 min | 2 | 2 |
| B7(1:4) | 1-2 min | 2 | 2 |
| B8(1:2) | 1-2 min | 2 | 2 |
| B8(1:4) | 1-2 min | 2 | 2 |
| B9(1:2) | 1-2 min | 2 | 2 |
| B9(1:4) | 1-2 min | 2 | 2 |
| B10(1:2) | 2 min | 2 | 2 |
| B10(1:4) | 3 min | 2 | 2 |
| B11(1:2) | 1-2 min | 2 | 2 |
| B11(1:4) | 1-2 min | 2 | 2 |
| B12(1:2) | 1-2 min | 2 | 2 |
| B12(1:4) | 1-2 min | 2 | 2 |
| B13(1:2) | 1-2 min | 2 | 2 |
| B13(1:4) | 2 min | 2 | 2 |
| B14(1:2) | 1-2 min | 2 | 2 |
| B14(1:4) | 1-2 min | 2 | 2 |
| B15(1:2) | 4 min | 2 | 2 |
| B15(1:4) | 6 min | 2 | 2 |
| B16(1:2) | 14 min | 2 | 2 |
| B16(1:4) | 20 min | 2 | 2 |

TABLE 5

Results with the comparative adhesive compositions

| Catalysts | Curing time |
|---|---|
| Ref. 8 | No curing |
| Ref. 9 | No curing |
| Ref. 10 | No curing |
| Ref. 11 | No curing |
| Ref. 12 | No curing |

Table 5 shows that the adhesive compositions comprising a catalyst based on oxime ligand (without metal alkoxide) do not cure.

In contrast, Table 4 shows that the adhesive compositions according to the invention, i.e. comprising a catalyst based on titanium or zirconium alkoxide and oxime according to the invention, have satisfactory curing times, on the order of only 1 to 2 minutes for certain catalysts, and said adhesive compositions are stable.

Ex. 4: Tests with the Adhesive Compositions Comprising the Silylated Polymer (A2)

Various adhesive compositions comprising the silylated polymer A2 (SAX® 260) and various catalysts were prepared and evaluated.

The molar amount of catalyst in each adhesive composition is 9.5×10 mol. Thus, the amount by weight of catalyst is adjusted according to the molar mass of each catalyst and the amount by weight of polymer A2.

Experimental Protocol for Each Test:

The catalyst ($9.5 \cdot 10^{-5}$ mol) in a solvent of type THF, methyl ethyl ketone or ethyl acetate (100 µL) is added to a 1 mL tube. The mixture is stirred for 1 hour at room temperature (23° C.). The polymer A2 (10 g) is introduced into a plastic container (50 mm in diameter and 30 mm in height). The catalyst is introduced into said plastic container and mixed with the polymer A2 for 1 minute. The curing time is then measured according to the protocol described in Example 2. Stability is evaluated according to the protocol described in Example 2.

Curing times and stability are shown in Tables 6 and 7 below.

TABLE 6

Results with the adhesive compositions according to the invention

| Catalysts | Curing time | Stability 7 days | Stability 1 month |
|---|---|---|---|
| B1(1:4) | 72 h | 2 | 1 |
| B2(1:4) | 24 h | 2 | 2 |
| B4(1:2) | 36 h | 2 | 2 |
| B4(1:4) | 36 h | 2 | 2 |
| B5(1:2) | 72 h | 2 | 1 |
| B5(1:4) | 48 h | 2 | 1 |
| B6(1:2) | 48 h | 2 | 1 |
| B6(1:4) | 30 h | 2 | 1 |
| B9(1:2) | 72 h | 2 | 2 |
| B9(1:4) | 48 h | 2 | 2 |
| B10(1:2) | 48 h | 2 | 2 |
| B10(1:4) | 48 h | 2 | 2 |
| B12(1:4) | 48 h | 2 | 2 |
| B14(1:2) | 72 h | 2 | 1 |
| B14(1:4) | 48 h | 2 | 1 |
| B15(1:2) | 8 h-24 h | 2 | 2 |
| B15(1:4) | 8 h | 2 | 2 |
| B16(1:2) | 72 h | 2 | 2 |
| B16(1:4) | 48 h | 2 | 2 |

TABLE 7

Results with the comparative adhesive compositions

| Catalysts | Curing time | Stability 7 days | Stability 1 month |
|---|---|---|---|
| Ref. 1 | 48 h | 2 | 0 |
| Ref. 8 | No curing | — | — |
| Ref. 9 | No curing | — | — |
| Ref. 10 | No curing | — | — |
| Ref. 11 | No curing | — | — |
| Ref. 12 | No curing | — | — |

It was observed that the adhesive compositions comprising a catalyst based on titanium or zirconium alkoxide (without oxime ligand) in admixture with the polymer A2 (generally valid for the polymers of formula (III) described above) are not stable. The inventors indeed observed that in the presence of polymers of formula (III), the catalysts consisting solely of alkoxide could self-react. Thus, after storage, the adhesive composition comprising a polymer of formula (III), such as the polymer A2, and a catalyst consisting of titanium or zirconium alkoxide, cannot cure properly due to the instability of the catalyst itself.

Furthermore, Table 7 shows that the adhesive compositions comprising a catalyst based on oxime ligand (without metal alkoxide) do not cure.

In contrast, Table 6 shows that the adhesive compositions according to the invention, i.e. comprising a catalyst based on titanium or zirconium alkoxide and oxime according to the invention, have both good stability and satisfactory curing times, which may be on the order of 24 h or 48 h, with a silylated polymer of type A2 (difficult to cure).

Ex. 5: Tests with the Formulations Comprising Two Silylated Polymers (A2 and A3) and Additives (Fillers C2 and C3, Plasticizer C4 and Moisture Absorber C5)

Different formulations comprising 12% by weight of a silylated polymer A2 (SAX® 260), 4% by weight of a second silylated polymer A3 (SAX® 015), 28% by weight of fillers C2, 40% by weight of fillers C3, 15% by weight of a plasticiser C4 and 0.8% by weight of a moisture absorber C5.

Next, a given molar amount ($9.5 \times 10^{-5}$ mol) of catalyst is added to each formulation described above, while varying the nature of the catalyst. Thus, the amount by weight of catalyst is adjusted according to the molar mass of each catalyst and the mass amount of the formulation.

Experimental Protocol for Each Test:

The catalyst ($9.5 \cdot 10^{-5}$ mol) in a solvent of type THF, methyl ethyl ketone or ethyl acetate (100 µL) is added to a 1 mL tube. The mixture is stirred for 1 hour at room temperature (23° C.). 10 g of the formulation comprising the polymers A1 and A2 and the additives C2, C3, C4 and C5 is introduced into a plastic container (50 mm in diameter and 30 mm in height). The catalyst is introduced into said plastic container and mixed with the formulation (polymers+additives) for 1 minute at 1800 rpm with a speed mixer. The curing time is then measured according to the protocol described in Example 2.

Stability is evaluated according to the protocol described in Example 2.

Curing times and stability are shown in Tables 8 and 9 below.

TABLE 8

Results with the adhesive compositions according to the invention

| Catalysts | Curing time | Stability 7 days | Stability 1 month |
|---|---|---|---|
| B2(1:2) | 48 h | 2 | 2 |
| B4(1:2) | 8 h-24 h | 2 | 1 |
| B4(1:4) | 8 h-24 h | 2 | 1 |
| B5(1:2) | 24 h-48 h | 2 | 2 |
| B5(1:4) | 24 h-48 h | 2 | 2 |
| B6(1:2) | 24 h-48 h | 2 | 1 |
| B6(1:4) | 8 h-24 h | 2 | 1 |
| B8(1:4) | 48 h | 2 | 2 |
| B15(1:2) | 8 h-24 h | 2 | 1 |
| B15(1:4) | 8 h-24 h | 2 | 2 |
| B16(1:2) | 72 h | 2 | 2 |
| B16(1:4) | 72 h | 2 | 2 |

TABLE 9

Results with the comparative adhesive compositions

| Catalysts | Curing time | Stability 7 days | 1 month |
|---|---|---|---|
| Ref. 1 | 48 h | 2 | 0 |
| Ref. 8 | No curing | — | — |
| Ref. 9 | No curing | — | — |
| Ref. 10 | No curing | — | — |
| Ref. 11 | No curing | — | — |
| Ref. 12 | No curing | — | — |

Table 9 shows that the adhesive compositions comprising a catalyst based on oxime ligand (without titanium or zirconium alkoxide) do not cure.

In contrast, Table 8 shows that the adhesive compositions according to the invention, i.e. comprising a catalyst based on titanium or zirconium alkoxide and oxime according to the invention, have both good stability and satisfactory curing times.

Ex. 6: Variation of the Amount of Catalyst

Further tests were carried out by varying the amount of catalyst from 0.05% to 5% by weight based on the total weight of the adhesive composition.

6.1. Adhesive Composition Comprising the Silylated Polymer A1 (Geniosil® STP-E10) and from 0.05 to 5% by Weight of a Catalyst.

The catalysts tested are those prepared according to Example 1 above.

FIG. 1 shows the results expressed as curing efficiency in $min^{-1}$ (inverse of the curing time) as a function of the amount of catalyst (in percent by weight in the adhesive composition).

In this FIG. 1, the curves represent different catalysts tested. As illustrated in FIG. 1, the catalysts according to the invention are as efficient at low concentration (less than 1% by weight) as the catalysts of the prior art (Ref. 1 denoted DBTDL in FIG. 1) and the catalysts according to the invention are much more efficient (much higher curing rate) than the catalysts of the prior art at contents ranging from 1 to 5% by weight.

6.2. Adhesive Composition Comprising the Silylated Polymer A2 (SAX® 260) and from 0.05 to 5% by Weight of a Catalyst.

The catalysts tested are those prepared according to Example 1 above.

Figure 2:
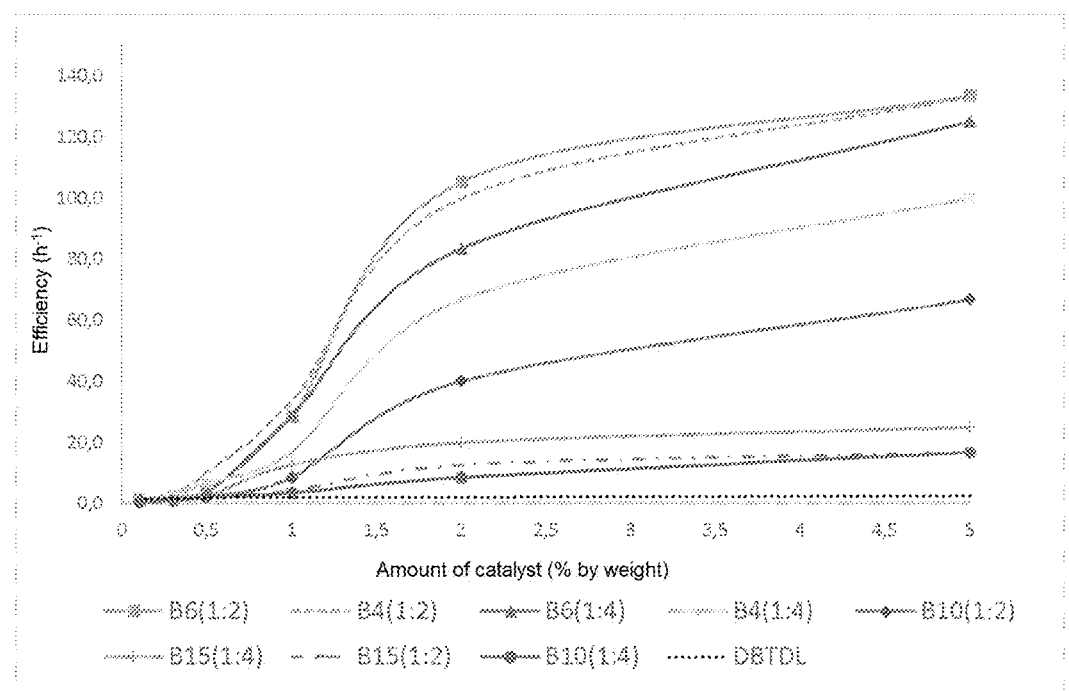
FIG. 2 shows the curing efficiency (quantifying the curing rate) of another silylated polymer as a function of the amount of catalyst for different catalysts.

FIG. 2 shows the results expressed as curing efficiency in $h^{-1}$ (inverse of the curing time) as a function of the amount of catalyst (in percent by weight in the adhesive composition).

In this FIG. 2, the curves represent different catalysts tested. As illustrated in FIG. 2, the catalysts according to the invention are as efficient at low concentration (less than 0.5% by weight) as the catalysts of the prior art (Ref. 1 denoted DBTDL in FIG. 1) and the catalysts according to the invention are much more efficient (much higher curing rate) than the catalysts of the prior art at contents ranging from 0.5 to 5% by weight.

The invention claimed is:

1. An adhesive composition comprising at least one silylated polymer (A) and at least one catalyst (B),
said at least one silylated polymer comprising at least one group of formula (I):

(I)

wherein:
$R^4$ represents a linear or branched alkyl radical having from 1 to 4 carbon atoms, it being possible that when there are more than one radicals $R^4$, the latter are identical or different;
$R^5$ represents a linear or branched alkyl radical having from 1 to 4 carbon atoms, it being possible that when there are more than one radicals $R^5$, the latter are identical or different, it being possible that two groups $OR^5$ may be engaged in the same ring;
p is an integer equal to 0, 1 or 2;
and said at least one catalyst being selected from the metal compounds obtained by reaction, in the absence of any other reagent in said reaction:
of at least one metal alkoxide,
with at least one oxime selected from an oxime of formula (V) or an oxime of formula (VI):

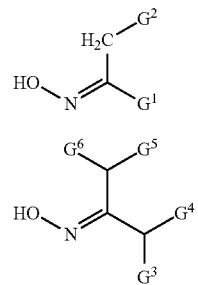

wherein:
$G^1$ is a hydrogen atom or a linear or branched alkyl radical having from 1 to 4 carbon atoms;
$G^2$ is a hydrogen atom or a radical selected from a linear or branched alkyl radical having from 1 to 10 carbon atoms, a linear or branched alkenyl radical having from 2 to 10 carbon atoms, a cyclic alkyl radical having from 3 to 10 carbon atoms, an aryl radical or a radical —$N(G^7G^8)$ where $G^7$ and $G^8$ independently represent a linear or branched alkyl radical having from 1 to 10 carbon atoms or a linear or branched alkenyl radical having from 2 to 10 carbon atoms or a benzyl radical;
$G^3$ represents either a hydrogen atom or an alkyl group having from 1 to 4 carbon atoms, or forms the remainder of an aliphatic ring having between 4 and 14 carbon atoms with the groups $G^4$ and/or $G^5$ and/or $G^6$, said aliphatic ring optionally comprising one or more heteroatoms and/or one or more double bonds and said aliphatic ring being optionally substituted by one or more alkyl groups having from 1 to 4 carbon atoms,
$G^4$ represents either a hydrogen atom or an alkyl group having from 1 to 4 carbon atoms, or forms the remainder of an aliphatic ring having between 4 and 14 carbon atoms with the groups $G^3$ and/or $G^5$ and/or $G^6$, said aliphatic ring optionally comprising one or more heteroatoms and/or one or more double bonds and said aliphatic ring being optionally substituted by one or more alkyl groups having from 1 to 4 carbon atoms,
it being understood that at least one of the groups $G^3$ or $G^4$ forms the remainder of an aliphatic ring with at least one of the groups $G^5$ or $G^6$;
$G^5$ represents either a hydrogen atom or an alkyl group having from 1 to 4 carbon atoms, or forms the remainder of an aliphatic ring having between 4 and 14 carbon atoms with the groups G³ and/or G⁴ and/or G⁶, said aliphatic ring optionally comprising one or more heteroatoms and/or one or more double bonds and said aliphatic ring being optionally substituted by one or more alkyl groups having from 1 to 4 carbon atoms, G⁶ represents either a hydrogen atom or an alkyl group having from 1 to 4 carbon atoms, or forms the remainder of an aliphatic ring having between 4 and 14 carbon atoms with the groups G³ and/or G⁴ and/or G⁵, said aliphatic ring optionally comprising one or more heteroatoms and/or one or more double bonds and said aliphatic ring being optionally substituted by one or more alkyl groups having from 1 to 4 carbon atoms, it being understood that at least one of the groups G⁵ or G⁶ forms the remainder of an aliphatic ring with at least one of the groups G³ or G⁴, and wherein the adhesive composition is substantially free of free oxime.

2. The composition according to claim 1, wherein the silylated polymer corresponds to one of the formulae (II), (III), (IV) or (VII):

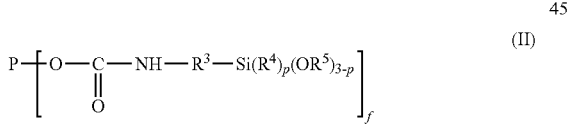

(II)

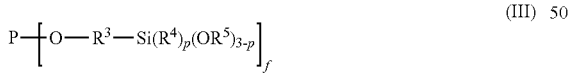

(III)

(IV)

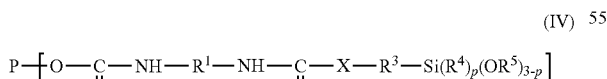

(VII)

wherein:
R⁴, R⁵ and p have the same meaning as in the formula (I) described in claim 1, P represents a saturated or unsaturated, linear or branched polymer radical optionally comprising one or more heteroatoms, such as oxygen, nitrogen, sulphur, silicon, and P' represents a polysiloxane, R¹ represents a divalent hydrocarbon radical having from 5 to 15 carbon atoms which may be aromatic or aliphatic, linear, branched or cyclic, R³ represents a linear or branched divalent alkylene radical having from 1 to 6 carbon atoms, X represents a divalent radical selected from —NH—, —NR⁷— or —S—, R⁷ represents a linear or branched alkyl radical having from 1 to 12 carbon atoms, f is an integer ranging from 1 to 6.

3. The composition according to claim 2, wherein the silylated polymer corresponds to one of the formulae (II), (III) or (IV) as defined in claim 2.

4. The composition according to claim 3, wherein the silylated polymer corresponds to one of the formulae (II'), (III') or (IV'):

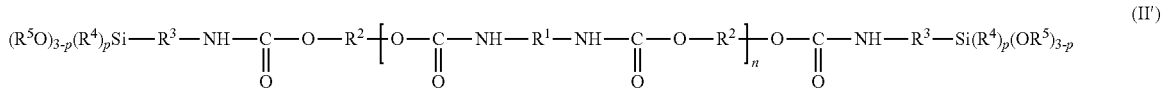

(II')

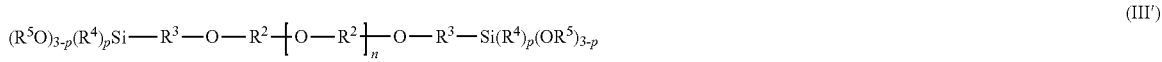

(III')

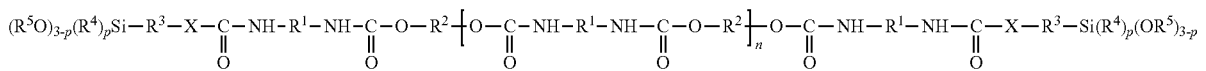

(IV')

wherein in the formulae (II'), (III') and (IV')

$R_1$ represents a divalent hydrocarbon radical having from 5 to 15 carbon atoms which may be aromatic or aliphatic, linear, branched or cyclic, R³ represents a linear or branched divalent alkylene radical having from 1 to 6 carbon atoms, R⁴ represents a linear or branched alkyl radical having from 1 to 4 carbon atoms, it being possible that when there are more than one radicals R⁴, the latter are identical or different;

R⁵ represents a linear or branched alkyl radical having from 1 to 4 carbon atoms, it being possible that when there are more than one radicals R⁵, the latter are identical or different, it being possible that two groups OR⁵ may be engaged in the same ring;

X represents a divalent radical selected from —NH—, —NR⁷— or —S—,

R⁷ represents a linear or branched alkyl radical having from 1 to 12 carbon atoms, and p is an integer equal to 0, 1 or 2;

R² represents a saturated or unsaturated, linear or branched divalent hydrocarbon radical optionally comprising one or more heteroatoms, such as oxygen, nitrogen, sulphur, or silicon, n is an integer greater than or equal to 0.

5. The composition according to claim 2, wherein the silylated polymer corresponds to one of the formulae (II'), (III') or (IV'):

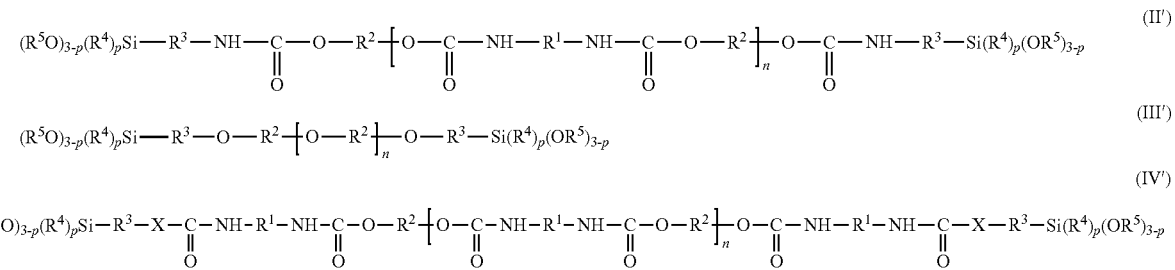

in the formulae (II'), (III') and (IV')
$R^1$, $R^3$, $R^4$, $R^5$, X, $R^7$ and p have the same meaning as in the formulae (II), (III) and (IV) described in claim 2,
$R^2$ represents a saturated or unsaturated, linear or branched divalent hydrocarbon radical optionally comprising one or more heteroatoms, such as oxygen, nitrogen, sulphur, silicon,
n is an integer greater than or equal to 0.

6. The adhesive composition according to claim 1, wherein the metal alkoxide corresponds to the formula $M(OR)_y$ where
M represents a metal,
y is equal to 3 or 4, and
R represents a linear or branched alkyl group having from 1 to 5 carbon atoms.

7. The adhesive composition according to claim 1, wherein the oxime is an oxime of formula (V) wherein:
$G^1$ represents a methyl group or an ethyl group; and
$G^2$ represents hydrogen or a linear or branched alkyl group having from 1 to 8 carbon atoms, or a phenyl group, or a group —$N(G^7G^8)$ where $G^7$ and $G^8$ represent a methyl, ethyl, propyl, butyl, pentyl or benzyl (—$CH_2$—$C_6H_5$) group;
or an oxime of formula (VI) wherein:
$G^3$ and $G^6$ each represent a hydrogen atom; and
$G^4$ and $G^5$ form an aliphatic ring having from 5 to 11 carbon atoms, said ring being optionally substituted by one or more methyl, ethyl and/or propyl groups and said ring optionally comprising one or more heteroatoms selected from an oxygen atom or a nitrogen atom, said nitrogen atom then not being bonded to a hydrogen atom.

8. The adhesive composition according to claim 1, wherein the catalyst (B) is obtained by reaction:
of an alkoxide selected from the following compounds: $Ti(OiPr)_4$, $Ti(OnPr)_4$, $Ti(OnBu)_4$, $Zr(OiPr)_4$, $Zr(OnPr)_4$, $Zr(OnBu)_4$;
and an oxime selected from the oximes of formula (V-1) and the oximes of formula (VI-1):

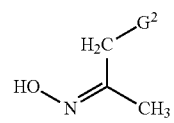
(V-1)

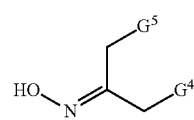
(VI-1)

wherein:
$G^2$ represents H or a methyl, ethyl, iso-propyl, n-propyl, n-butyl, iso-butyl, —$N(CH_2$—$C_6H_5)_2$ group;
$G^4$ and $G^5$ form a saturated aliphatic ring having from 5 to 11 carbon atoms.

9. The adhesive composition according to claim 1, wherein the catalyst (B) is obtained by reaction of the alkoxide with the oxime in an alkoxide:oxime molar ratio ranging from 1:1 to 1:4.

10. The adhesive composition according to claim 1, comprising at least 0.05% by weight, of catalyst (B) based on the total weight of the adhesive composition.

11. The adhesive composition according to claim 1, comprising at least 5% by weight, of silylated polymer (A) based on the total weight of the adhesive composition.

12. The adhesive composition according to claim 1, further comprising fillers.

13. The adhesive composition according to claim 1, characterized in that the silylated polymer (A) and the catalyst (B) are packaged in two separate compartments.

14. A bonding method comprising applying the adhesive composition according to claim 1 to a surface and then curing said adhesive composition.

15. An adhesive composition of claim 1 comprising
an amount of catalyst B in a range selected from 0.1 to 10% by weight, 0.5 to 5% by weight, or 1 to 3% by weight,
an amount of silylated polymer (A) selected from at least 10% by weight or at least 15% by weight, and
an amount of filler within a range selected from 20 to 70% by weight or 30 to 60% by weight, each based on the total weight of the adhesive composition.

16. The composition according to claim 1, wherein the reaction between the metal alkoxide and the oxime is represented by the following schematic equation:

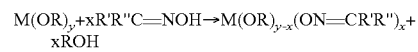

where
$M(OR)_y$ represents the metal alkoxide,
y is equal to 3 for trivalent metals and y is equal to 4 for tetravalent metals,
M represents a metal atom,
R represents a linear or branched alkyl or alkenyl group having from 1 to 5 carbon atoms,
R'R''C=NOH represents the oxime of formula (V) or (VI), and x is a number ranging from 1 to 4 for tetravalent metals and x is a number ranging from 1 to 3 for trivalent metals.

17. The composition according to claim 1, wherein the adhesive composition is completely free of free oxime.

18. A method comprising using a metal compound as curing catalyst for silylated polymers, wherein said metal compound is obtained by reaction:
of at least one metal alkoxide,
with at least one oxime selected from an oxime of formula (V) or an oxime of formula (VI):

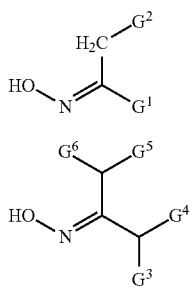

wherein:
- $G^1$ is a hydrogen atom or a linear or branched alkyl radical having from 1 to 4 carbon atoms;
- $G^2$ is a hydrogen atom or a radical selected from a linear or branched alkyl radical having from 1 to 10 carbon atoms, a linear or branched alkenyl radical having from 2 to 10 carbon atoms, a cyclic alkyl radical having from 3 to 10 carbon atoms, an aryl radical or a radical —$N(G^7G^8)$ where $G^7$ and $G^8$ independently represent a linear or branched alkyl radical having from 1 to 10 carbon atoms or a linear or branched alkenyl radical having from 2 to 10 carbon atoms or a benzyl radical;
- $G^3$ represents either a hydrogen atom or an alkyl group having from 1 to 4 carbon atoms, or forms the remainder of an aliphatic ring having between 4 and 14 carbon atoms with the groups $G^4$ and/or $G^5$ and/or $G^6$, said aliphatic ring optionally comprising one or more heteroatoms and/or one or more double bonds and said aliphatic ring being optionally substituted by one or more alkyl groups having from 1 to 4 carbon atoms,
- $G^4$ represents either a hydrogen atom or an alkyl group having from 1 to 4 carbon atoms, or forms the remainder of an aliphatic ring having between 4 and 14 carbon atoms with the groups $G^3$ and/or $G^5$ and/or $G^6$, said aliphatic ring optionally comprising one or more heteroatoms and/or one or more double bonds and said aliphatic ring being optionally substituted by one or more alkyl groups having from 1 to 4 carbon atoms,
  it being understood that at least one of the groups $G^3$ or $G^4$ forms the remainder of an aliphatic ring with at least one of the groups $G^5$ or $G^6$;
- $G^5$ represents either a hydrogen atom or an alkyl group having from 1 to 4 carbon atoms, or forms the remainder of an aliphatic ring having between 4 and 14 carbon atoms with the groups $G^3$ and/or $G^4$ and/or $G^6$, said aliphatic ring optionally comprising one or more heteroatoms and/or one or more double bonds and said aliphatic ring being optionally substituted by one or more alkyl groups having from 1 to 4 carbon atoms,
- $G^6$ represents either a hydrogen atom or an alkyl group having from 1 to 4 carbon atoms, or forms the remainder of an aliphatic ring having between 4 and 14 carbon atoms with the groups $G^3$ and/or $G^4$ and/or $G^5$, said aliphatic ring optionally comprising one or more heteroatoms and/or one or more double bonds and said aliphatic ring being optionally substituted by one or more alkyl groups having from 1 to 4 carbon atoms,
  it being understood that at least one of the groups $G^5$ or $G^6$ forms the remainder of an aliphatic ring with at least one of the groups $G^3$ or $G^4$;

said silylated polymers comprising at least one group of formula (I):

wherein:
- $R^4$ represents a linear or branched alkyl radical having from 1 to 4 carbon atoms, it being possible that when there are more than one radicals $R^4$, the latter are identical or different;
- $R^5$ represents a linear or branched alkyl radical having from 1 to 4 carbon atoms, it being possible that when there are more than one radicals $R^5$, the latter are identical or different, it being possible that two groups $OR^5$ may be engaged in the same ring;
- p is an integer equal to 0, 1 or 2, such that the obtained metal compound is substantially free of free oxime.

19. A method according to claim 18, wherein the silylated polymer corresponds to one of the formulae (II), (III), (IV) or (VII):

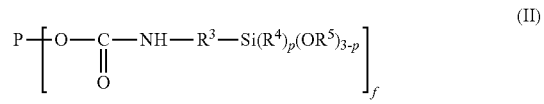

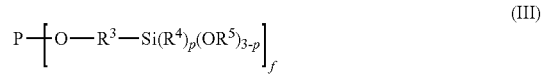

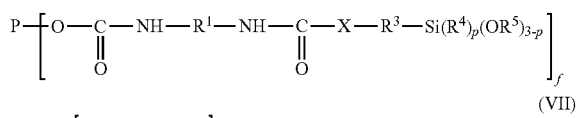

wherein:
- $R^4$ represents a linear or branched alkyl radical having from 1 to 4 carbon atoms, it being possible that when there are more than one radicals $R^4$, the latter are identical or different;
- $R^5$ represents a linear or branched alkyl radical having from 1 to 4 carbon atoms, it being possible that when there are more than one radicals $R^5$, the latter are identical or different, it being possible that two groups $OR^5$ may be engaged in the same ring;
- p is an integer equal to 0, 1 or 2;
- P represents a saturated or unsaturated, linear or branched polymer radical optionally comprising one or more heteroatoms, such as oxygen, nitrogen, sulphur, silicon, and
- P' represents a polysiloxane,
- $R^1$ represents a divalent hydrocarbon radical having from 5 to 15 carbon atoms which may be aromatic or aliphatic, linear, branched or cyclic,
- $R^3$ represents a linear or branched divalent alkylene radical having from 1 to 6 carbon atoms,
- X represents a divalent radical selected from —NH—, —$NR^7$— or —S—,
- $R^7$ represents a linear or branched alkyl radical having from 1 to 12 carbon atoms,
- f is an integer ranging from 1 to 6.

20. A method according to claim 19, wherein the silylated polymer corresponds to one of the formulae (II'), (III') or (IV'):

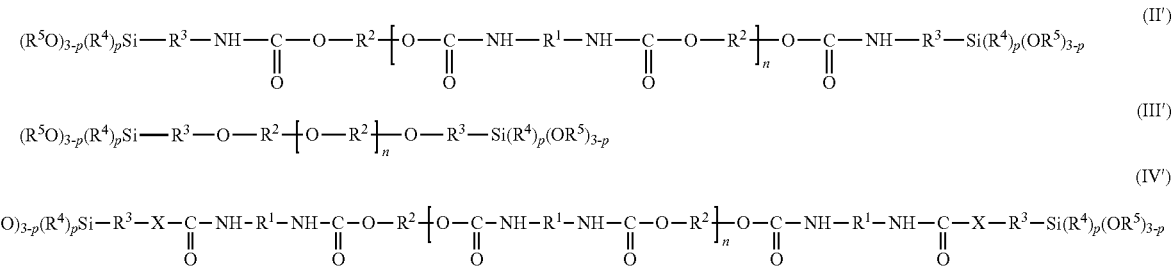

wherein in the formulae (II'), (III') and (IV')
- $R^1$ represents a divalent hydrocarbon radical having from 5 to 15 carbon atoms which may be aromatic or aliphatic, linear, branched or cyclic,
- $R^3$ represents a linear or branched divalent alkylene radical having from 1 to 6 carbon atoms,
- $R^4$ represents a linear or branched alkyl radical having from 1 to 4 carbon atoms, it being possible that when there are more than one radicals $R^4$, the latter are identical or different;
- $R^5$ represents a linear or branched alkyl radical having from 1 to 4 carbon atoms, it being possible that when there are more than one radicals $R^5$, the latter are identical or different, it being possible that two groups $OR^5$ may be engaged in the same ring;
- X represents a divalent radical selected from —NH—, —$NR^7$— or —S—,
- $R^7$ represents a linear or branched alkyl radical having from 1 to 12 carbon atoms, and
- p is an integer equal to 0, 1 or 2;
- $R^2$ represents a saturated or unsaturated, linear or branched divalent hydrocarbon radical optionally comprising one or more heteroatoms, such as oxygen, nitrogen, sulphur, silicon, and
- n is an integer greater than or equal to 0.

* * * * *